US007810083B2

(12) United States Patent
Chinya et al.

(10) Patent No.: US 7,810,083 B2
(45) Date of Patent: Oct. 5, 2010

(54) MECHANISM TO EMULATE USER-LEVEL MULTITHREADING ON AN OS-SEQUESTERED SEQUENCER

(75) Inventors: Gautham N. Chinya, Hillsboro, OR (US); Hong Wang, Santa Clara, CA (US); Xiang Zou, Beaverton, OR (US); James Paul Held, Portland, OR (US); Prashant Sethi, Folsom, CA (US); Trung Diep, San Jose, CA (US); Anil Aggarwal, Portland, OR (US); Baiju V. Patel, Portland, OR (US); Shiv Kaushik, Portland, OR (US); Bryant Bigbee, Scottsdale, AZ (US); John Shen, San Jose, CA (US); Richard A. Hankins, San Jose, CA (US); John L. Reid, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1221 days.

(21) Appl. No.: 11/026,597

(22) Filed: Dec. 30, 2004

(65) Prior Publication Data

US 2006/0150183 A1    Jul. 6, 2006

(51) Int. Cl.
*G06F 9/45* (2006.01)
*G06F 9/40* (2006.01)
*G06F 7/38* (2006.01)
*G06F 9/46* (2006.01)

(52) U.S. Cl. .............. 717/149; 717/134; 717/151; 712/203; 712/235; 718/100; 718/107; 718/108

(58) Field of Classification Search .............. 717/134
See application file for complete search history.

(56) References Cited

U.S. PATENT DOCUMENTS

| 6,006,320 | A | 12/1999 | Parady et al. | |
|---|---|---|---|---|
| 6,349,363 | B2 * | 2/2002 | Cai et al. | 711/129 |
| 6,769,122 | B1 * | 7/2004 | Daudel | 718/102 |
| 2002/0013803 | A1 * | 1/2002 | King et al. | 709/102 |
| 2002/0194458 | A1 * | 12/2002 | Soni | 712/227 |
| 2003/0191730 | A1 * | 10/2003 | Adkins et al. | 706/47 |

(Continued)

FOREIGN PATENT DOCUMENTS

WO    WO 2006/074059 A2    7/2006

OTHER PUBLICATIONS

Sasada K. et al—2003 PDPTA—Implementation and Evaluation of a Thread Library for Multithreaded Architecture—pp. 609-615, vol. 2.

(Continued)

*Primary Examiner*—Tuan Q Dam
*Assistant Examiner*—Isaac T Tecklu
(74) *Attorney, Agent, or Firm*—Caven & Aghevli LLC

(57) ABSTRACT

Method, apparatus and system embodiments to provide user-level creation, control and synchronization of OS-invisible "shreds" of execution via an abstraction layer for a system that includes one or more sequencers that are sequestered from operating system control. For at least one embodiment, the abstraction layer provides sequestration logic, proxy execution logic, transition detection and shred suspension logic, and sequencer arithmetic logic. Other embodiments are also described and claimed.

37 Claims, 15 Drawing Sheets

U.S. PATENT DOCUMENTS

| | | | |
|---|---|---|---|
| 2004/0107421 A1* | 6/2004 | VoBa et al. | 718/102 |
| 2004/0215939 A1* | 10/2004 | Armstrong et al. | 712/220 |
| 2005/0086547 A1* | 4/2005 | Kobayashi et al. | 713/310 |
| 2005/0125791 A1* | 6/2005 | Welbon et al. | 718/100 |
| 2005/0125802 A1* | 6/2005 | Wang et al. | 718/108 |
| 2005/0138333 A1* | 6/2005 | Samra | 712/218 |
| 2005/0198635 A1* | 9/2005 | Olszewski et al. | 718/100 |
| 2005/0223199 A1* | 10/2005 | Grochowski et al. | 712/235 |
| 2005/0251662 A1* | 11/2005 | Samra | 712/228 |
| 2006/0064695 A1* | 3/2006 | Burns et al. | 718/100 |
| 2006/0069936 A1* | 3/2006 | Lint et al. | 713/320 |
| 2006/0130062 A1* | 6/2006 | Burdick et al. | 718/100 |

OTHER PUBLICATIONS

Sato M. et al—2003 PDPTA—A Process and Thread Management of HTE Operating System "Future" for on Chip Multithreaded Architecture—pp. 1669-1675, vol. 4.

International Search Report for Patent Application PCT/US2005/047408, mailed on Jul. 26, 2006, 20 pages.

Office Action mailed for Chinese Patent Application No. 200580045750.X, dated Dec. 19, 2008, pp. 4 and English translation of 2 pages.

PCT, International Preliminary Report On Patentability (Chapter I of the Cooperation Treaty), Application No. PCT/US2005/047408, dated Jul. 26, 2007.

European Patent Office, First Office Action, Application No. 05 855 899.0-2211, dated Nov. 5, 2007.

Second Office Action Received for Chinese Patent Application No. 200580045750.X mailed on Feb. 5, 2010; 9 pages including English Translation.

Office Action Received for Japanese Patent Application No. 2007-549638, mailed May 11, 2010; 8 pages including English Translation.

Koichi Sasada et al., "Implementation and Evaluation of a Thread Library for Multithreaded Architecture", Proceedings of the Symposium on Advanced Computing System and Infrastructures (SACSIS) 2003, Information Processing Society of Japan (IPSJ), May 28, 2003, vol. 2003, No. 8, pp. 13-20 (National Academic Institution Article 2004-01704-002), 11 pages total, including English Abstract.

Mikiko Sato et al., "Process Management of the Operating System "Future" for On Chip Multithreaded Architecture", Proceedings of Computer System Symposium, Japan, Information Processing Society of Japan, Dec. 11, 2003, vol. 2003, No. 20, pp. 61-70 (National Academic Institution Article 2004-01968-007), 13 pages total, including English Abstract.

Takao Moriyama et al., "A Multiprocessor Resource Management Scheme which Considers Program Grain Size", IPSJ Research Report, Information Processing Society of Japan (IPSJ), Jul. 18, 1990, vol. 90, No. 60, pp. 103-108 (National Academic Institution Article 2000-00160-017), 9 pages total, including English Abstract.

* cited by examiner

MECHANISM TO EMULATE USER-LEVEL MULTITHREADING ON AN OS-SEQUESTERED SEQUENCER

BACKGROUND

1. Technical Field

The present disclosure relates generally to information processing systems and, more specifically, to multithreading on a multi-sequencer system in which one or more sequencers may be sequestered from an operating system.

2. Background Art

In order to increase performance of information processing systems, such as those that include microprocessors, both hardware and software techniques have been employed. On the hardware side, microprocessor design approaches to improve microprocessor performance have included increased clock speeds, pipelining, branch prediction, superscalar execution, out-of-order execution, and caches. Many such approaches have led to increased transistor count, and have even, in some instances, resulted in transistor count increasing at a rate greater than the rate of improved performance.

Rather than seek to increase performance strictly through additional transistors, other performance enhancements involve software techniques. One software approach that has been employed to improve processor performance is known as "multithreading." In software multithreading, an instruction stream may be divided into multiple instruction streams that can be executed in parallel. Alternatively, multiple independent software streams may be executed in parallel.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading ("SoEMT"), only one thread, at most, is active at a given time.

Increasingly, multithreading is supported in hardware. For instance, in one approach, processors in a multi-processor system, such as chip multiprocessor ("CMP") systems (multiple processors on single chip package) and symmetric multithreading ("SMP") systems (multiple processors on multiple chips), may each act on one of the multiple software threads concurrently. In another approach, referred to as simultaneous multithreading ("SMT"), a single physical processor is made to appear as multiple logical processors to operating systems and user programs. For SMT, multiple software threads can be active and execute simultaneously on a single processor without switching. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

For a system that supports concurrent execution of software threads, such as SMT, SMP, and/or CMP systems, an operating system ("OS") application may control scheduling and execution of the software threads. Typically, however, operating system control does not scale well; the ability of an operating system application to schedule threads without a negative impact on performance is commonly limited to a relatively small number of threads.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of an apparatus, system and method to perform user-level multithreading on a multi-sequencer system wherein user-level shred control on OS-sequestered sequencers is provided via an OS-transparent abstraction layer.

DETAILED DESCRIPTION

The following discussion describes selected embodiments of methods, systems and mechanisms to allow a user-level application program to create and control OS-independent threads of execution (referred to as "shreds") in a multi-sequencer multithreading system. The user-level shreds are created, scheduled and executed with full operating system transparency. The hardware of the multi-sequencer system on which disclosed techniques are performed does not necessarily support architectural shred control instructions. Instead, such functionality may be provided through an OS-transparent software or firmware emulation layer.

The mechanisms described herein may be utilized with single-core or multi-core multithreading systems. In the following description, numerous specific details such as processor types, multithreading environments, system configurations, numbers and topology of sequencers in a multi-sequencer system, microarchitectural structures, and instruction nomenclature and parameters have been set forth to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

Figure 1:
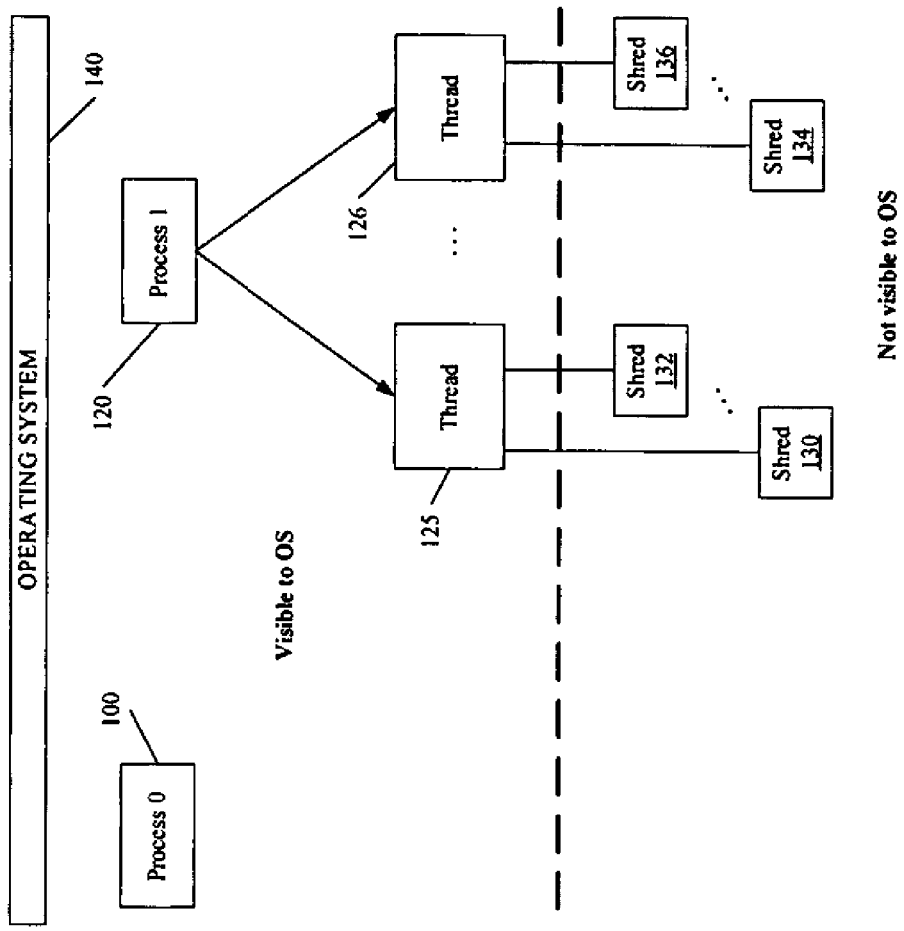
FIG. 1 is a block diagram presenting a graphic representation of a general parallel programming approach for a multi-sequencer system.
Figure 2:
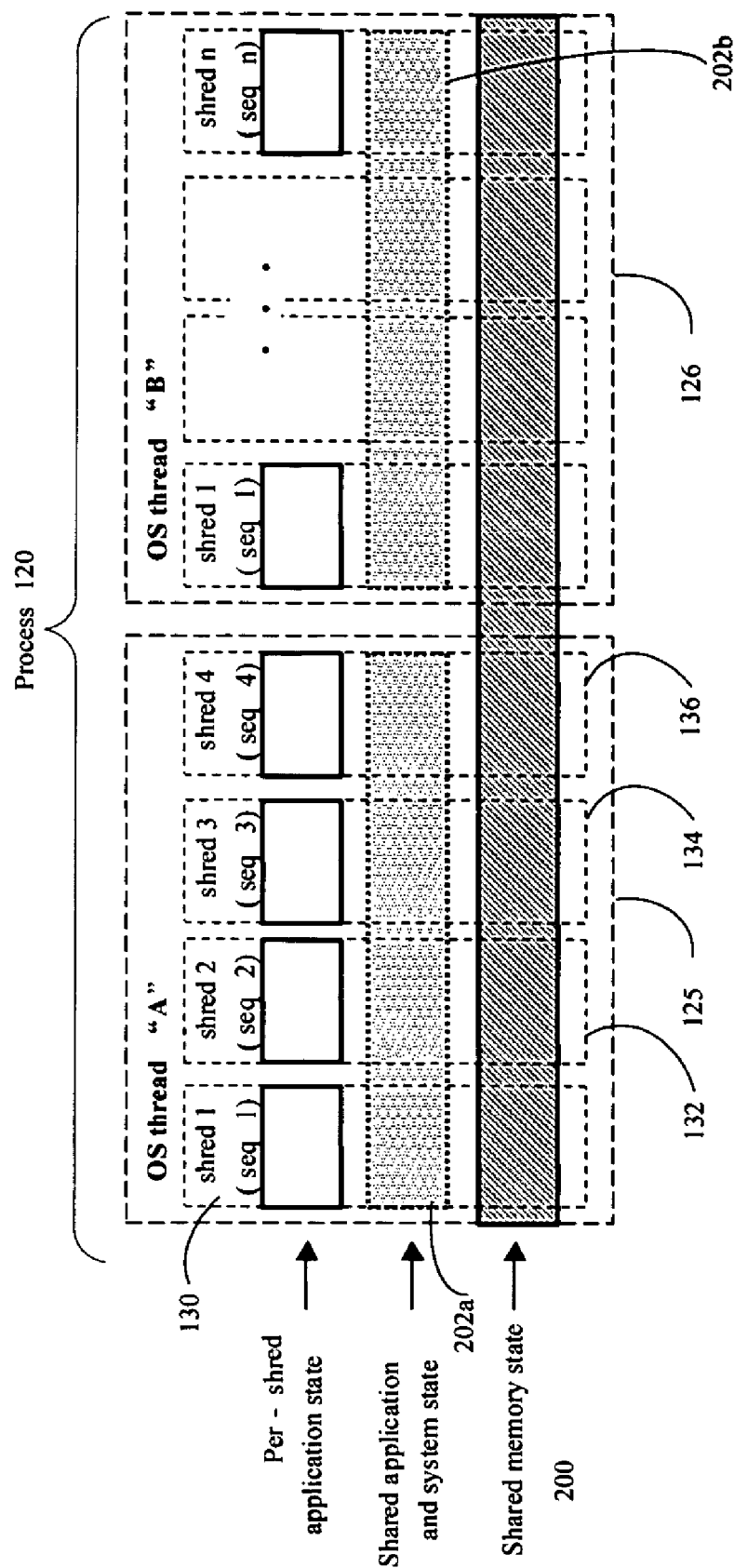
FIG. 2 is a block diagram illustrating shared memory and state among threads and shreds for at least one embodiment of user-level multithreading.
Figure 3:
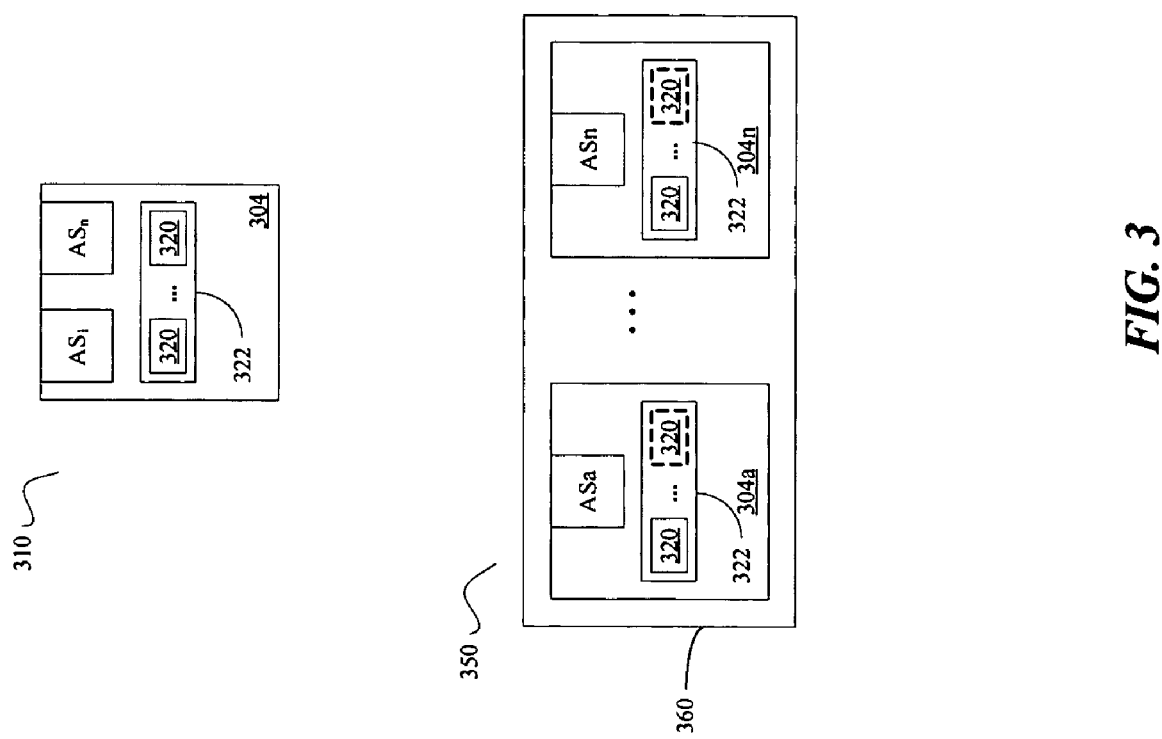
FIG. 3 is a block diagram illustrating various embodiments of multi-sequencer systems.
Figure 4:
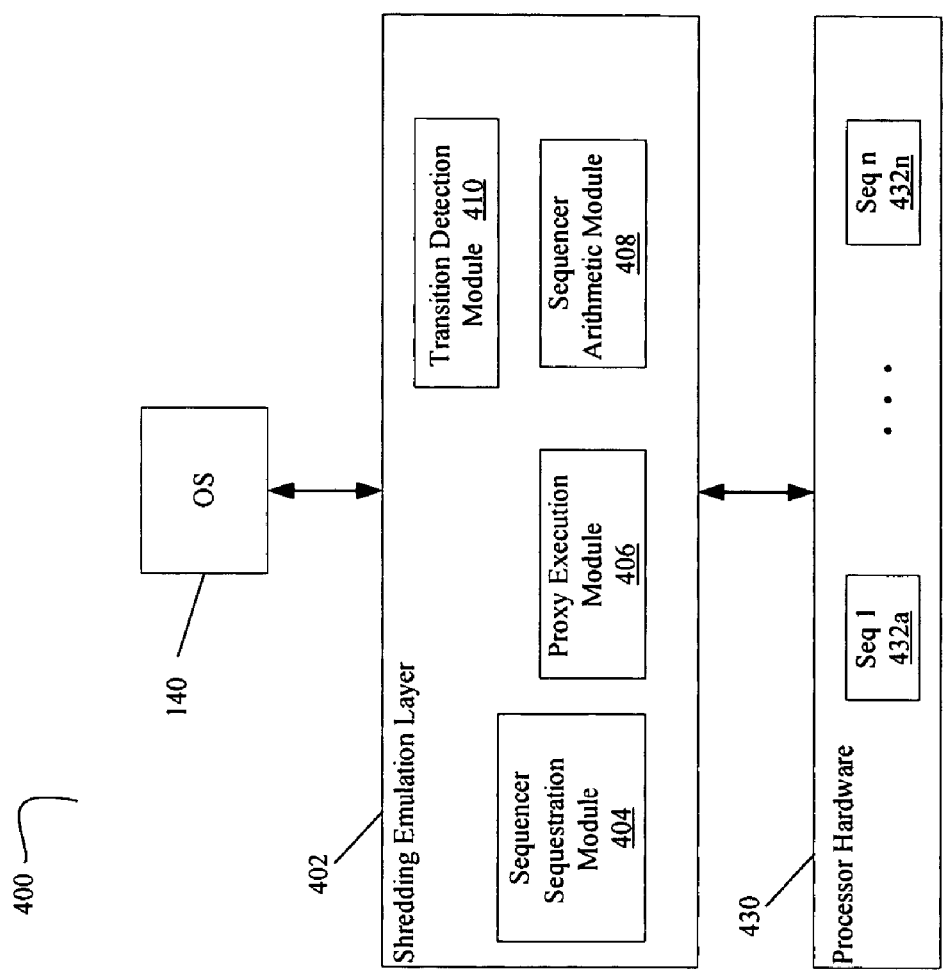
FIG. 4 is a block diagram illustrating at least one embodiment of a software mechanism for a multi-sequencer multithreading system.

FIGS. 1 and 2 discussed below illustrate a shared-memory multiprocessing paradigm that includes user-controlled "shreds," which are instruction sequences executed on sequencers that are sequestered from operating system view and control. Such OS-sequestered sequencers are sometimes referred to as "OS-invisible" sequencers. FIGS. 3 and 15 illustrate sample embodiments of processors and/or systems on which such paradigm may be implemented. FIG. 4 illustrates, generally, at least one embodiment of an abstraction layer, referred to as a shredding emulation layer, that may provide user-level shredding capabilities on a multi-sequencer system for which the sequencer hardware does not support architectural shredding instructions. Finally, FIGS. 5-14 illustrate specific method and system embodiments for a shredding emulation layer.

A shared-memory multiprocessing paradigm may be used in an approach referred to as parallel programming. According to this approach, an application programmer may split a software program, sometimes referred to as an "application" or "process," into multiple tasks to be run concurrently in order to express parallelism for a software program. All threads of the same software program ("process") share a common logical view of memory.

FIG. 1 is a block diagram illustrating a graphic representation of a parallel programming approach on a multi-sequencer multithreading system. FIG. 1 illustrates processes 100, 120 visible to an operating system 140. These processes 100, 120 may be different software application programs, such as, for example, a word processing program and an email management program. Commonly, each process operates in a different address space.

The operating system ("OS") 140 is commonly responsible for managing the user-created tasks for a process, such as process 120 illustrated in FIG. 1. Accordingly, the operating system 140 may create a distinct thread 125, 126 for each of the user-defined tasks associated with a process 120, and may map the threads 125, 126 to thread execution resources. (Thread execution resources are not shown in FIG. 1, but are discussed in detail below.) The OS 140 is commonly responsible for scheduling these threads 125, 126 for execution on the execution resources. The threads associated with a single process typically have the same view of memory and share the same virtual address space.

Because the OS 140 is responsible for creating, mapping, and scheduling threads, the threads 125, 126 are "visible" to the OS 140. In addition, embodiments of the present invention comprehend additional threads 130-136 that are not visible to the OS 140. That is, the OS 140 does not create, manage, or otherwise acknowledge or control these additional threads 130-136. These additional threads, which are neither created nor controlled by the OS 140, are sometimes referred to herein as "shreds" 130-136 in order to distinguish them from OS-visible threads. The shreds are created and managed by user-level programs and are scheduled to run on sequencers that are sequestered from the operating system. The OS-sequestered sequencers share the same ring 0 state as OS-visible sequencers. Shreds 130-136 thus share the same execution environment (address map) that is created for the threads 125, 126 associated with the same process 126.

As used herein, the terms "thread" and "shred" include, at least, the concept of independent execution of a stream of instructions executing concurrently with other threads and/or shreds of a process. The thread and "shred" terms both encompass the idea, therefore, the execution of a software instruction stream along with the associated processor state. As used herein, a distinguishing factor between a thread (which is OS-controlled) and a shred (which is not visible to the operating system and is instead user-controlled), which are both instruction streams, lies in the difference of how execution of the thread and shred instruction streams is managed. A thread is generated in response to a system call to the OS. The OS generates that thread and allocates resources to run the thread. Such resources allocated for a thread may include data structures that the operating system uses to control and schedule the threads.

In contrast, at least one embodiment of a shred is generated via a user-level software instruction that invokes a software library or other OS-independent mechanism for generating a shred that the OS is not aware of. A shred may thus be generated in response to a user-level software library call. The software library call may create an entry in a shred work queue (not shown) that is maintained by the software library. Such shed work queue may hold an entry for each shred that is scheduled to run on an OS-sequestered sequencer. For a further discussion for at least one embodiment of a shred work queue, please see copending application U.S. patent Ser. No. 11/027,445, entitled "Mechanism to Schedule Threads on OS-Sequestered Sequencers without Operating System Intervention."

FIG. 2 is a block diagram illustrating, in graphical form, further detail regarding the statement, made above, that all threads of the same software program or process share a common logical view of memory. For embodiments of the present invention, this statement is also true regarding shreds associated with a process 100, 120. That is, a plurality of shreds 130-136 may be associated with a single OS-managed thread 125. All sequencers (seq. 1-seq. 4) initialized by a thread 125 to run shreds associated with that thread 125 share the same view of virtual memory that is constructed by the operating system for the thread.

FIG. 2 is discussed herein with reference to FIG. 1. FIG. 2 assumes the graphical representation of a process 120, threads 125, 126 and shreds 130-136 illustrated in FIG. 1. However, such representation should not be taken to be limiting. Embodiments of the present invention do not necessarily impose an upper or lower bound on the number of threads or shreds associated with a process. Regarding a lower bound, FIG. 1 illustrates that every process running at a given time need not necessarily be associated with any threads or shreds at all. For example, Process 0 100 illustrated in FIG. 1 is shown to run without threads nor shreds at the particular time illustrated in FIG. 1.

However, another process 120 may be associated with one or more threads 125, 126 as illustrated in FIG. 1. In addition, the process 120 may additionally be associated with one or more shreds 130-136 as well. The representation of two threads 125, 126 and four shreds 130-136 for a process 120 is illustrative only and should not be taken to be limiting. The number of OS-visible threads associated with a process may be limited by the OS program. However, the upper bound for the cumulative number of shreds associated with a process is limited, for at least one embodiment, only by the number of thread execution resources available at a particular time during execution. FIG. 2 illustrates that a second thread 126 associated with a process 120 may have a different number (n) of threads associated with it than the first thread 125. (N may be 0 for either or both of the threads 125, 126.)

FIG. 2 illustrates that a particular logical view 200 of memory is shared by all threads 125, 126 associated with a particular process 120. FIG. 2 illustrates that each thread 125, 126 has its own application and system state 202a, 202b, respectively. FIG. 2 illustrates that the application and system state 202 for a thread 125, 126 is shared by all shreds (for example, shreds 130-136) associated with the particular thread.

Accordingly, FIG. 2 illustrates that a system for at least one embodiment of the present invention may support a 1-to-many relationship between an OS-visible thread, such as thread 125, and the shreds 130-136 (which are not visible to the OS) associated with the thread. The shreds are not "visible" to the OS (see 140, FIG. 1) in the sense that an application programmer, not the OS, may employ user-level techniques to create, synchronize and otherwise manage and control operation of the shreds. While the OS 140 is aware of, and manages, a thread 125, 126, the OS 140 is not aware of, and does not manage or control, shreds.

Thus, instead of relying on the operating system to manage the mapping between thread unit hardware and shreds, it may be desirable for a user-level application to directly control such mapping and to directly manipulate control and state transfers associated with shred execution. To facilitate such direct control and manipulation, a user-visible feature of the architecture of the thread units may include at least a canonical set of instructions that allow a user-level application program direct manipulation and control of thread unit hardware.

For at least one embodiment, it may be desirable to implement any or all of the following capabilities in a multi-shredding system. Such capabilities may each be supported by a separate architectural instruction to effect the capability. Alternatively, the capabilities may be implemented by higher level primitives or software library functions that are based upon a small, canonical set of shred creation and control instructions. For a further discussion of a hardware implementation of canonical architectural user-level shredding instructions may be found in copending patent application U.S. patent Ser. No. 11/173,326, entitled "A Mechanism For Instructions Set-Based Thread Execution on a Plurality of Instruction Sequencers."

The capabilities that may be provided to a programmer as part of a user-level shredding programming paradigm may include one or more of any or all of the following capabilities:
1. Sequestering of a sequencer from OS control
2. Sequencer Arithmetic to effect inter-sequencer control transfers
3. Ring transition detection and user-level exception handling
4. "Proxy Execution" by an OS-visible sequencer to support handling of privileged operations for a sequestered sequencer Each of these capabilities is discussed in further detail below.

It may be desirable to provide user-level shred creation and control capabilities on systems for which the above-listed user-level shredding capabilities are not architecturally supported in hardware. Accordingly, the functionality of shred creation, control, and synchronization instructions may be instead emulated by an abstraction layer. It is this emulation of user-level shredding to which much of the following discussion and claims address themselves. Such emulation may be implemented, as mentioned above, in systems for which the underlying thread units do not support architectural instructions for user-level shred creation, mapping, control, and synchronization. However, embodiments of the software emulation mechanism discussed herein is not limited to such systems. The embodiments may be practiced on systems in which one or more of the thread units does support architectural shred instructions.

As used herein, a thread unit, also interchangeably referred to herein as a "sequencer", may be any physical or logical unit capable of executing a thread or shred. It may include next instruction pointer logic to determine the next instruction to be executed for the given thread or shred. For example, the OS thread 125 illustrated in FIG. 2 may execute on a sequencer, not shown, while each of the active shreds 130-136 may execute on other sequencers, "seq 1"-"seq 4", respectively. A sequencer may be a logical thread unit or a physical thread unit. Such distinction between logical and physical thread units is illustrated in FIG. 3.

FIG. 3 is a block diagram illustrating selected hardware features of embodiments 310, 350 of a multi-sequencer system capable of performing disclosed techniques. FIG. 3 illustrates selected hardware features of an SMT multi-sequencer multithreading environment 310. FIG. 3 also illustrates selected hardware features of a multiple-core multithreading environment 350, where each sequencer is a separate physical processor core.

In the SMT environment 310, a single physical processor 304 is made to appear as multiple logical processors (not shown), referred to herein as $LP_1$ through $LP_n$, to operating systems and user programs. Each logical processor $LP_1$ through $LP_n$ maintains a complete set of the architecture state $AS_1$-$AS_n$, respectively. The architecture state includes, for at least one embodiment, data registers, segment registers, control registers, debug registers, and most of the model specific registers. The logical processors $LP_1$-$LP_n$ share most other resources of the physical processor 304, such as caches, execution units, branch predictors, control logic and buses. Although such features may be shared, each thread context in the multithreading environment 310 can independently generate the next instruction address (and perform, for instance, a fetch from an instruction cache, an execution instruction cache, or trace cache).

Thus, the processor 304 includes logically independent next-instruction-pointer and fetch logic 320 to fetch instructions for each thread context, even though the multiple logical sequencers may be implemented in a single physical fetch/decode unit 322. For an SMT or embodiment, the term "sequencer" encompasses at least the next-instruction-pointer and fetch logic 320 for a thread context, along with at least some of the associated architecture state, AS, for that thread context. It should be noted that the sequencers of an SMT system 310 need not be symmetric. For example, two SMT sequencers for the same physical core may differ in the amount of architectural state information that they each maintain.

Thus, for at least one embodiment, the multi-sequencer system 310 is a single-core processor 304 that supports concurrent multithreading. For such embodiment, each sequencer is a logical processor having its own instruction next-instruction-pointer and fetch logic 320 and its own architectural state information AS, although the same physical processor core 304 executes all thread instructions. For such embodiment, the logical processor maintains its own version of the architecture state, although execution resources of the single processor core may be shared among concurrently-executing threads.

FIG. 3 also illustrates at least one embodiment of a multi-core multithreading environment 350. Such an environment 350 includes two or more separate physical processors 304a-304n that is each capable of executing a different thread/shred such that execution of at least portions of the different threads/shreds may be ongoing at the same time. Each processor 304a through 304n includes a physically independent fetch unit 322 to fetch instruction information for its respective thread or shred. In an embodiment where each processor 304a-304n executes a single thread/shred, the fetch/decode unit 322 implements a single next-instruction-pointer and fetch logic 320. However, in an embodiment where each processor 304a-304n supports multiple thread contexts, the fetch/decode unit 322 implements distinct next-instruction-pointer and fetch logic 320 for each supported thread context. The optional nature of additional next-instruction-pointer and fetch logic 320 in a multiprocessor environment 350 is denoted by dotted lines in FIG. 3.

Thus, for at least one embodiment of the multi-core system 350 illustrated in FIG. 3, each of the sequencers may be a processor core 304, with the multiple cores 304a-304n residing in a single chip package 360. Each core 304a-304n may be either a single-threaded or multi-threaded processor core. The chip package 360 is denoted with a broken line in FIG. 3 to indicate that the illustrated single-chip embodiment of a multi-core system 350 is illustrative only. For other embodiments, processor cores 304a-304n of a multi-core system 350 may reside on separate chips.

For at least one embodiment, the user-level shred creation, control and synchronization capabilities listed above are not provided by the architectural instruction set of the underlying sequencer hardware, such as that illustrated in FIG. 3. Nonetheless, it may be desirable for a programmer to be able to write code that invokes user-level shredding functionality. For such systems, user-level shredding functionality may be emulated via a firmware or software abstraction layer, so that a programmer may transparently write code as if the underlying hardware supported the shred instructions. The software or firmware layer may act to provide a layer of abstraction such that user-level creation, control and synchronization of OS-independent shreds of execution on OS-sequestered sequencers are effected.

FIG. 4 is a block diagram illustrating at least one embodiment of an abstraction layer 402 for a multi-sequencer multithreading system 400 that includes one or more sequencers that can be sequestered from view and control of the an operating system 140. The abstraction layer 402 provides a mechanism to effect user-level thread control for a system in which architectural instructions for user-level shredding are not supported on sequestered sequencers. Accordingly, for the embodiment illustrated in FIG. 4, it is assumed that one or more of the multiple sequencers 432a-432n does not provide architectural hardware support for user-level creation and control of OS-independent shreds of execution and that the same sequencer may be sequestered from OS view and control.

FIG. 4 illustrates that the abstraction 402 is a layer of abstraction that logically lays on top of the multi-sequencer hardware 430. An operating system 140 may operate at least one level higher than the abstraction layer, which is sometimes referred to herein as a shredding emulation layer ("SEL").

FIG. 4 illustrates the SEL 420 may include modules to perform various shred functions. FIG. 4 illustrates that the SEL 420 may include a sequencer sequestration module 404, a proxy execution module 406, a sequencer arithmetic module 408, and a transition detection module 410. Such logical representation of the functional modules 404, 406, 408, 410 of SEL 420 should not be taken to be limiting. One of skill in the art will recognize that the modules are intended to represent logic for performing a specified function. The logic may be software, hardware, firmware, or any combination thereof. In addition, the functionality for multiple modules 404, 406, 408, 410 may be implemented together as larger functions or logic modules. Alternatively, the logic for one or more particular modules may be subdivided into smaller sub-modules. Also, one or more of the modules may share logic with one or more of the other modules, such as shared function calls or other shared logic, rather than including redundant copies of logic.

For at least one embodiment, the SEL 402 may be an independent logic module. For at least one other embodiment, the SEL 402 may be implemented as modifications to an existing logic module. For example, the SEL 402 may be implemented as a set of modifications to an existing software layer of abstraction. Certain embodiments discussed below include the SEL 402 as a set of modifications to a virtual machine monitor ("VMM"). Again, such embodiments are provided only for purposes of illustrating selected features of the SEL 402 in more detail, and in the context of a specific implementation environment. However, the following discussion of such specifics with respect to a VMM embodiment should not be taken to be limiting. The SEL 402 may be implemented independently, or as part of any other abstraction layer that provides an interface between an operating system and sequencer hardware. Nonetheless, for purposes of clarification for those embodiments of the SEL 402 that may be implemented as modifications to an existing VMM, the following discussion of FIG. 5 provides additional information regarding an illustrative VVM embodiment.

Figure 5:
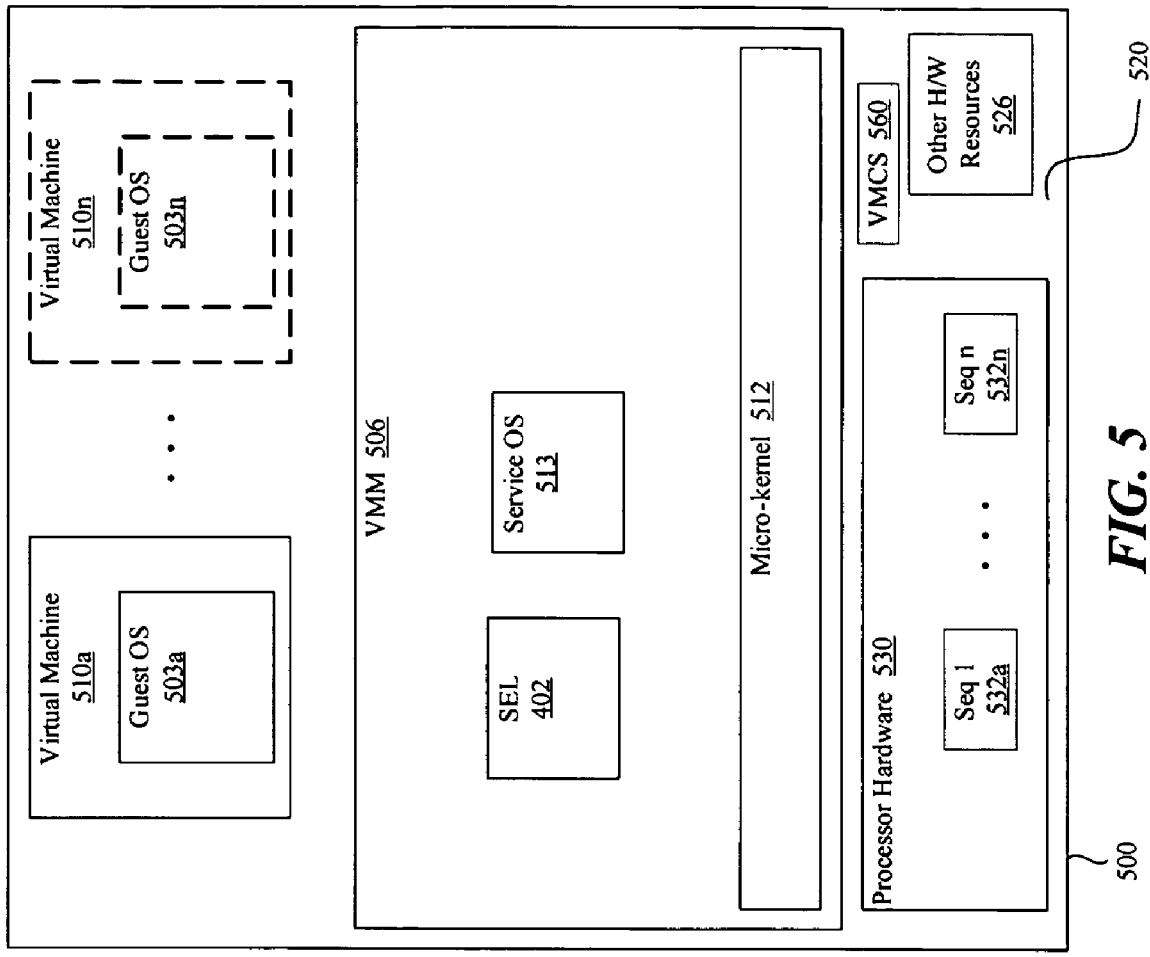
FIG. 5 is a block diagram illustrating a multi-sequencer processing system that includes a shredding emulation layer as part of a virtual machine monitor.

FIG. 5 is a block diagram illustrating a multi-sequencer processing system 500 that includes an SEL 402 as part of a VMM 506. The system 500 includes hardware resources 520, which includes processor resources 530. The processor resources 530 may include multiple sequencers 532a-532n. The sequencers 532a-532n may be asymmetric.

The illustrative system 500 illustrated in FIG. 5 may also include other hardware resources 526 that have been individually omitted in order to avoid obscuring other features discussed herein. Such other hardware resources 526 may include, for example but without limitation: memory, peripheral devices, chipset, memories, and the like.

FIG. 5 illustrates that, in addition to the hardware resources 520 discussed immediately above, the system 500 may also include software resources. Such software resources may include a Virtual Machine Monitor 506. The VMM 506 is capable of partitioning and managing a processing system's 500 hardware resources in a way that allows one or more operating systems 503a-503n to execute on the same system 500 concurrently. Each OS 503a-503n may operate within a substantially independent software environment, referred to as partitions or virtual machines (VMs) 510a-510n. For the example embodiment, illustrated in FIG. 5, VMM 506 supports multiple virtual machines 510a-510n, each running its own independent guest OS 503a-503n, respectively. One of skill in the art will recognize that embodiments discussed herein may be employed in a system that supports a single VM 510. Additional VM's 510 are indicated with dotted lines in FIG. 5 to indicate that they are optional.

For at least one embodiment, the VMM 506 is implemented through execution of software or firmware components such as a micro-kernel 512 and a service OS 513. Micro-kernel 512 may include a small nucleus of instructions for system management tasks such as instruction scheduling.

Service OS 513 may include device drivers and environment virtualization software for creating and maintaining virtual machines.

Accordingly, the VMM software 506, for at least one embodiment of the system 500 illustrated in FIG. 5, can retain control of the hardware resources 520 and can run the guest OSs 503*a*-503*n* in a deprivileged mode as a guest to the VMM 506. Certain guest events, instructions and situations may trap to the VMM 506, and the VMM 506 may then handle such events, instructions, and/or situations. The VMM 506 thus presents the guest OS software 503*a*-503*n* with a processor abstraction.

As used herein, a trap from a guest OS 503*a*-503*n* to the VMM 506 is referred to herein as a VMEXIT. A transition from VMM 506 control back to the guest OS 503*a*-503*n* is referred to herein as a VMENTER. Transitions between the VMM 506 and the guest OS software 503*a*-503*n* may be controlled by a hardware structure referred to as a Virtual Machine Control Structure (VMCS) 560. The VMCS 560 may store the guest (such as, e.g., 503*a*-503*n*) state, the VMM 506 state, and the state of various control registers upon such transitions into and out of VMM 506 control. The control register values may indicate which guest events should trap to the VMM 506 and what state is loaded and stored on VMEXIT and VMENTER transitions.

For at least one embodiment, the VMM 506 performs the following processing for VMEXIT and VMENTER transitions. For VMEXIT, state information for the guest OS 503 that generated the transition event is stored to the guest state area of the VMCS 560. For VMENTER, the guest state is restored from the guest state area of the VMCS 560. For at least one embodiment, the VMM 506 may read and write fields of the VMCS 560 utilizing specialized read and write instructions, referred to herein as VMREAD and VMWRITE, respectively.

The basic functionality of the VMCS 560 and the VMM 506 may be utilized for at least one embodiment of a system that implements a SEL 402 as part of the VMM 506. Specific examples of how the VMM 506 may be utilized to emulate specific user-level shred creation, control, and synchronization capabilities are set forth below.

Sequencer Sequestration. As used herein, the term Sequester Sequestration is used to mean that the one or more sequencers of a multi-sequencer multithreading system have transitioned into a sequestered state or condition. A characteristic of such sequestered state or condition is that the OS does not schedule instructions for sequencers in such state or condition. Accordingly, for a system which, at a given time, has one or more sequencers in a sequestered state, we say that only non-sequestered sequencers are "visible" to the OS. At any given time, depending on whether one or more sequencers are sequestered, the OS may have visibility to a fewer number of sequencers than are actually available on the platform. Only the "visible" non-sequestered sequencers are available for OS-controlled thread execution. Shreds may be executed, responsive to user-level instructions, on sequestered (i.e., "OS-invisible") sequencers.

Figure 6:
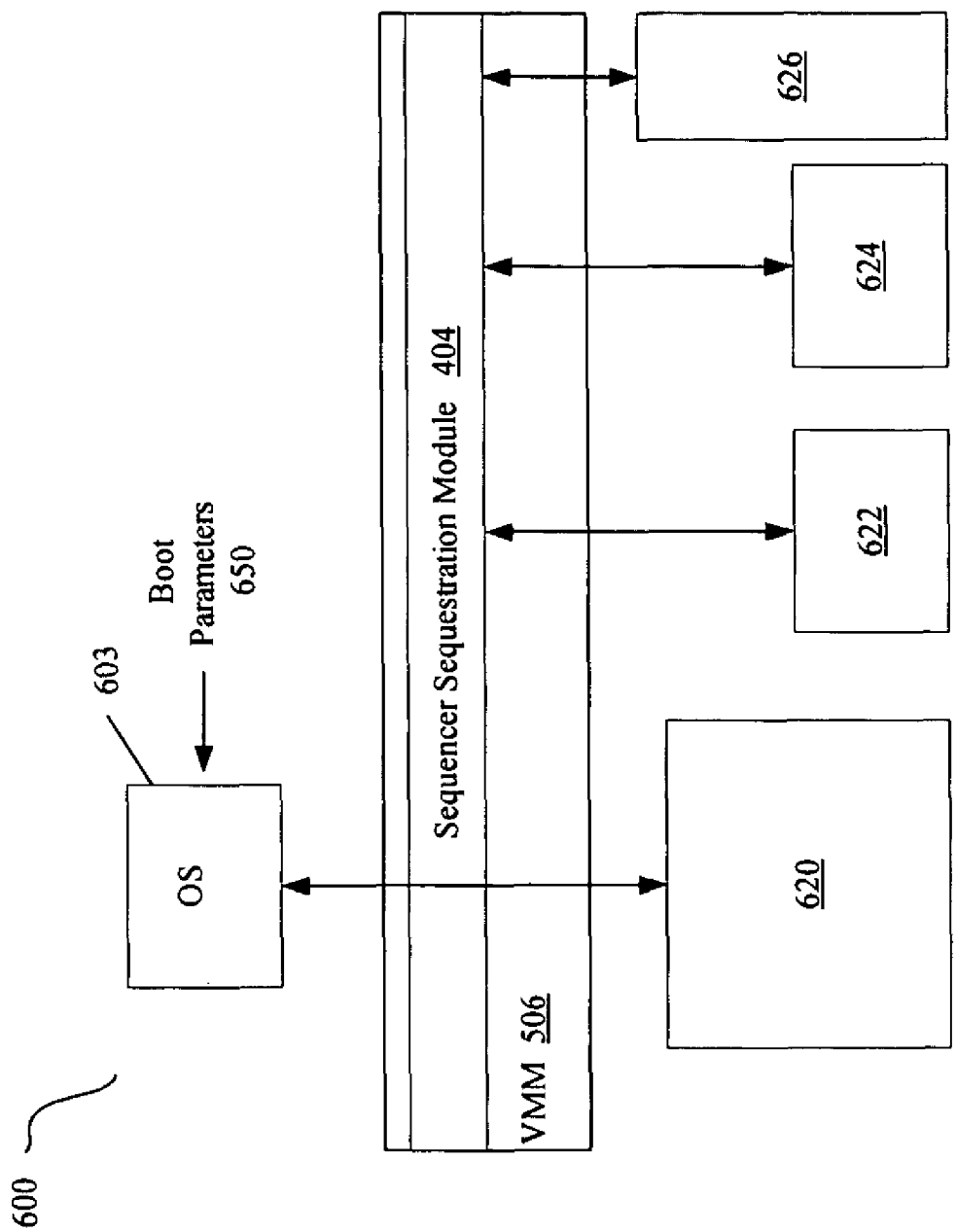
FIG. 6 is a block diagram illustrating at least one embodiment of sequestration of one or more sequencers.

FIG. 6 is a block diagram illustrating at least one embodiment of sequencer sequestration. It should be noted that the sequestered sequencers may, but need not, be symmetric with each other or with OS-visible sequencers. For at least one embodiment, sequestration of one or more sequencers 622, 624, 626 may be effected during boot of an operating system 603, such as a guest OS in a virtual machine. For such embodiment, boot parameters 650 for the OS 603 may reside in memory, such as in a file (e.g., boot.ini). The boot parameters 650 may be configured prior to boot such that only a subset (for example, sequencer 620) of the total number of sequencers of a system 600 is visible to the OS 603. (The boot parameters may be configured, for at least one embodiment, by a system administrator that has root privileges to reconfigure the operating system set-up.) The VMM 506 may be launched, for at least one embodiment, after the OS 603 has completed its boot process.

Alternatively, sequestration of one or more sequencers 622, 624, 626 may be effected for an embodiment wherein the VMM 506 is launched prior to the OS 603. Such embodiment may, for example, launch the VMM 506 via BIOS (basic input/output system) or EFI (extensible firmware interface) or other firmware that acts as an interface between hardware and the operating system 603. The VMM 506 may be launched by such firmware prior to handoff to the OS 603. Rather than utilize the OS's boot parameter file to effect the sequestration, the number of sequencers to be exposed to the OS 603 may be controlled by values in the ACPI (advanced configuration and power interface) table that is utilized by the operating system 603. (Again, the ACPI may be programmed by a system administrator or by the vendor of a boot manager (BIOS, EFI, etc.).)

While only one OS-visible sequencer 620 is depicted in FIG. 6, such depiction is for illustrative purposes only, and should not be taken to be limiting. Any number of the sequencers of a system 600 may be visible to the operating system 603. Limitations of the ability of the operating system 603 to efficiently handle large numbers of concurrent threads may inform the decision regarding how many of the total sequencers in a system 600 should be visible to the OS 603 vs. how many should be sequestered.

FIG. 6 illustrates that the VMM 506 may control all the sequencers 620, 622, 624, 626 of the system 600, including the sequencers(s) 620 that are visible to the OS 603. The sequestered sequencers 622, 624, 626, although not visible to the operating system 603, operate under the direct control of the VMM 506. The VMM 506 may run the OS 603 in a guest mode for the visible sequencer(s) 620.

The sequencer sequestration module 404 may perform processing to initialize the sequestered sequencers 622, 624, 626 in order to prepare them to execute threads as directed by user-level instructions. After VMM launch, the sequencer sequestration module 404 may send an initialization instruction to each sequestered sequencer 622, 624, 626.

Because they are not visible to the OS 603, the sequestered sequencers do not execute privileged code that requires service by a privileged ring of the operating system 603. For at least one embodiment, the inability of a particular sequencer to execute privileged instructions (such as, for example, systems calls and page fault processing), may be masked from the programmer by a transparent proxy mechanism, discussed in further detail below.

Figure 7:
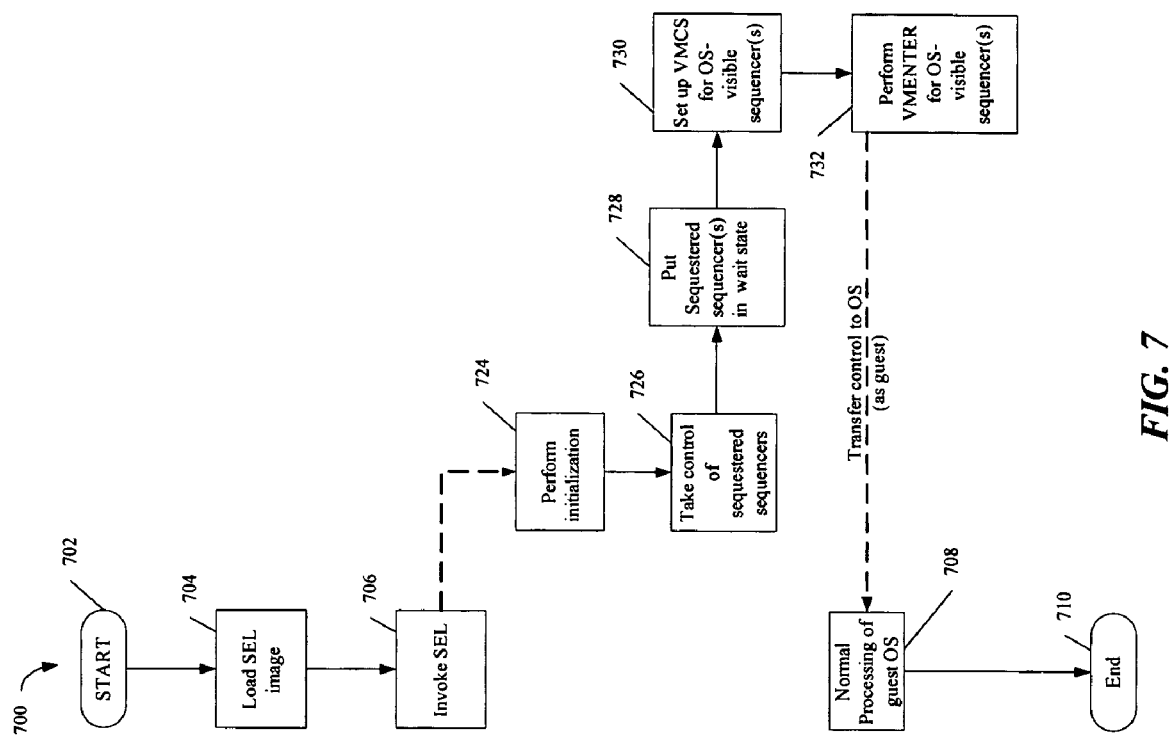
FIG. 7 is a flowchart illustrating at least one embodiment of a method for launching a software layer that includes a shredding emulation layer.

FIG. 7 is a flowchart illustrating at least one embodiment of a method 700 for launching a software layer that includes a shredding emulation layer, such as SEL 402 illustrated in FIG. 4. For at least one embodiment, the SEL 402 may be launched as part of a more comprehensive software module, such as a VMM. The method 700 may be initiated by a launch driver on an OS-visible sequencer.

FIG. 7 illustrates that the method 700 begins at block 702 and proceeds to block 704. At block 704, an image of the software layer is loaded into memory for the system. For at least one embodiment, the image may be loaded by a launch driver. Processing then proceeds to block 706. At block 706, the software layer is invoked. As a result, control is transferred from the launch driver to the SEL image that was loaded at bock 704.

FIG. 7 illustrates that, responsive to the invocation at block 706, the SEL may perform certain processing 724-732. One will appreciate, of course, that the processing 724-732 need not necessarily be performed in the order illustrated, and that some blocks may be combined together to be performed as larger macro-blocks or may, alternatively, broken into smaller sub-blocks.

For at least one embodiment, the processing 724-732 illustrated in FIG. 7 may be performed by a software layer, such as a VMM, that has been modified to include an SEL 420. FIG. 7 illustrates that, at block 724, the method 700 performs initialization. The initialization 724 may include execution of a VMXON instruction, which turns on the VMX (Virtual Machine Extension) features available in the sequencers. The initialization 724 may also include setting up a separate virtual address space in which the VMM is to execute. From block 724, processing proceeds to block 726.

At block 726, the method 700 takes control of the sequencer(s) that are sequestered from the OS. For at least one embodiment, such control is asserted via sending of startup interprocessor interrupt (or SIPI) to each of the sequestered sequencer(s). Processing then proceeds from block 726 to 728.

At block 728, each of the sequestered sequencer(s) is placed into a wait state to wait for work from a scheduler. Work may thereafter be scheduled on sequestered sequencer(s) by a shred scheduler (not shown). The shred scheduler may operate, for example, as part of a run-time library (not shown). Alternatively, the shred scheduler may operate as part of the SEL (see 420, FIG. 4). Additional detail regarding at least one embodiment of a shred scheduler may be found in co-pending U.S patent application Ser. No. 11/027,445, entitled "Mechanism to Schedule Threads on OS-Sequestered Sequencers without Operating System Intervention."

From block 728, processing may proceed to block 730. At block 730, the method 700 sets up a virtual memory control structure (VMCS) for the OS-visible sequencer(s). The VMCS values set at block 730 may be manipulated to cause a trap to the VMM every time an exception is incurred on the OS-visible sequencer. Processing may then proceed to block 732.

At block 732, the method 700 may perform a VMENTER to return control to the driver that initially launched the SEL (see block 706). The transfer 732 effectively gives control to the OS for the OS-visible sequencer. For at least one embodiment, after this first VMENTER is performed at launch, the operating system for the OS-visible sequencer may run in deprivileged mode ("0D", discussed below) as a guest on top of a VMM. The guest OS may then proceed to perform normal processing at block 708. Processing for the method 700 may then end at block 710.

One of skill in the art will recognize that the blocks of FIG. 7 may be performed in a variety of alternative orders that maintains the general functionality described herein. For example, after block 726, blocks 730 and 732 may be performed before block 728 is performed.

Figure 8:
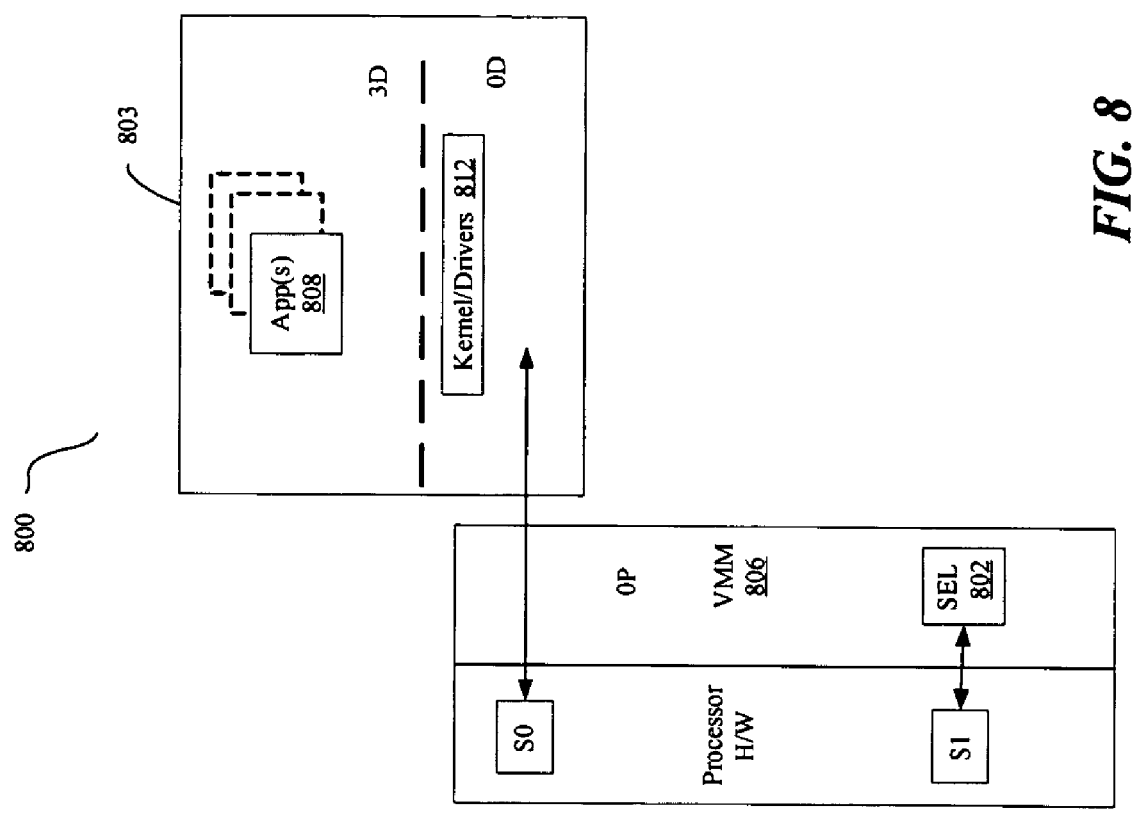
FIG. 8 is a block diagram illustrating the state of a sequestered sequencer and an OS-visible sequencer of an example multi-sequencer system after launch of an operating system and virtual machine monitor.

FIG. 8 is a block diagram illustrating the state of a sequestered sequencer S1 and an OS-visible sequencer S0 of an example multi-sequencer system 800 after VMM 806 and OS 803 launch. The sample illustrated in FIG. 8 includes two sequencers, S0 and S1. For at least one embodiment, each sequencer S0, S1 is a logical processor of an SMT multi-threaded processor 800. For at least one alternative embodiment, the sequencers S0, S1 may be independent processor cores capable of concurrently executing threads for a multi-core multithreading system 800. As with all embodiments described herein, disclosed techniques may also be performed on systems that include more or fewer sequencers than illustrated in the Figure.

FIG. 8 illustrates that a first sequencer, S0, is visible to the OS 803 and may execute threads at the direction and control of the OS 803. The OS 803 schedules work to be executed by the sequencer S0. However, because the OS 803 operates as a guest of the VMM 806, the VMM 806 controls both sequencers S0, S1. That is, for at least one embodiment the VMM 806 controls all the sequencers S0, S1 and virtualizes the OS-visible sequencer S0 to the OS 803. When the sequencer S0 tries to execute a privileged operation, such as, for example, if an application 806 running on the OS 803 tries to access a control register, the VMM 808 may manipulate the control value that is exposed to the OS 803.

The application(s) 808 that run on top of the OS 803 run on ring 3 of the OS 803, in a deprivileged mode. Deprivileged ring 3 operational mode for such applications 808 is denoted in FIG. 8 by the nomenclature "3D". The kernel and drivers 812 of the guest OS 803 run in ring 0 of the operating system 803, but in a deprivileged mode. Deprivileged ring 0 operational mode for the operating system 803 is denoted in FIG. 8 by the nomenclature "0D".

FIG. 8 illustrates that sequencer S1, which is sequestered from the OS 803, operates under VMM 806 control. FIG. 8 further illustrates that the VMM 806 operates in a privileged ring 0 mode, P0. Certain privileged operations may cause VMEXIT to the VMM 806 if they are attempted to be executed by OS-visible sequencer S0. Further description of the SEL 802 handling of such VMEXIT processing is described in further detail below in connection with FIGS. 9-13.

Sequencer Arithmetic. As used herein, the term Sequencer Arithmetic is used to refer user-level transfer of control between two sequestered sequencers. For at least one embodiment of an SEL (see 402, FIG. 4), both synchronous and asynchronous inter-sequencer control transfer capabilities are provided. For alternative embodiments, of course, only synchronous or only asynchronous inter-sequencer control transfer capabilities, respectively, may be provided. Synchronous and/or asynchronous user-level inter-sequencer control transfer capabilities may be provided by a SEL, regardless of whether the underlying sequencer hardware provides architectural support for such capabilities.

Generally, the synchronous control transfer feature of the SEL may be invoked by a user-level instruction that, when executed by a first sequencer, causes a signal to be sent to a second sequencer. For at least one embodiment, a new user-level instruction, referred to herein as VMCALL, may be utilized by a programmer to invoke the sequencer arithmetic capability of the SEL. Parameters of the VMCALL instruction may be manipulated by the user-level application in order to effect various types of inter-sequencer control transfer scenarios. (An illustrative sampling of such inter-sequencer control transfer scenarios are set forth below in Table. 1.) A user-level application that makes use of the new VMCALL instruction is referred to herein as a "shred-aware" application.

At least one embodiment of the new VMCALL instruction allows the shred-aware guest software to force a VMEXIT from the guest software to the VMM. The VMM then manages the signaling to the sequestered sequencer. Table 1 sets forth various sample embodiments of signaling scenarios that may be initiated by a user-level application's use of the VMCALL instruction and that may be handled by the VMM. Because the VMCALL causes an exit from guest software control, the scenarios listed in Table 1 are referred to herein as "egress scenarios." For other embodiments, additional or different egress scenarios may be implemented.

TABLE 1

Egress Scenarios for Synchronous Inter-Sequencer Control Transfer to transfer from OS-visible Sequencer to Sequestered Sequencer -

| Scenario | Operation |
| --- | --- |
| Fork | Used to spawn a new shred of control in the program. The spawned shred begins at a new instruction address (EIP) and/or at a new stack address (ESP) on a sequestered sequencer while the shred-aware OS-visible parent sequencer falls through to the next instruction after the fork. |
| Join | Used to synchronize or merge multiple threads into a single continuing thread. The last thread to execute the join instruction continues execution with the following instruction while all others die. |
| Yield | Used to relinquish the sequestered sequencer if another shred is ready to run. When this operation is called by a shred, it's up to the scheduler to decide the next shred that shall be given sequencer access. If any other shred is ready to run it may be granted access to the sequencer and the current thread may be enqueued to a ready queue. However, if the ready queue is empty, the current shred may continue its execution. |
| Wait | Used to stall the current thread until it acquires a contended synchronization object (e.g. mutex or condition-variable or semaphore). |
| Scatter/set | Parallel/distributed multi-cast data or control message from one source sequencer to multiple destination sequencers. |
| Gather/get | Parallel/distributed reduction operation to merge data or control message from multiple source sequencers to a single destination sequencer. |
| SSAVE/RSTOR | Sequencer-aware architectural state save and restore operations |
| Go/Halt/Single-step | Sequencer-aware instruction sequencing operation used to resume and suspend instruction execution and enable single-stepping debugging capability. |

The synchronous inter-sequencer control transfer feature of sequencer arithmetic, referred to herein shred transfer (SXFR) capability, therefore provides a mechanism to perform inter-shred signaling for service between sequencers. The SXFR capability is synchronous, in the sense that the application programmer can control, by judiciously placing an instruction to invoke SXFR capability into shred-aware code, the timing of the execution of the control transfer in relation to execution of other instructions in the shred instruction stream of the sequencer generating the signal. As used herein, the sequencer generating a signal for SXFR capability is referred to as a servant sequencer and the recipient of the generated signal is referred to herein as a client sequencer.

SXFR capability may be invoked by a user-level application by a variant of the new VMCALL instruction. In processing the VMCALL instructions, the VMM may handle the new user-level instructions such that they cause asynchronous control transfer to be accepted by a sequestered sequencer. The VMM may generate, as a result of the user-generated VMCALL instruction, a control message that is sent to the sequestered sequencer. Such control message may cause the servant sequencer to asynchronously accept control as directed by the VMM. Such asynchronous ingress events cause a shred to process the incoming event, similar to interrupt processing. Accordingly, the servant sequencer need not be idle when the ingress signal is received. If a shred is currently executing on a sequestered sequencer at the time that the ingress scenario signal is received by the sequestered sequencer, the VMM may redirect execution of the shred to a new instruction pointer address (EIP). As is mentioned above, such processing is akin to delivering a user-level interrupt to an executing shred in order to redirect execution on the shred to a new EIP.

Because the signals cause a shred to begin execution under VMM control, the scenarios listed in Table 2 are referred to herein as "ingress scenarios." For other embodiments, additional or different ingress scenarios may be implemented.

TABLE 2

Ingress Scenarios for Asynchronous Inter-Sequencer Control Transfer to transfer from OS-visible Sequencer to Sequestered Sequencer

| Scenario | Operation |
| --- | --- |
| Go_shred | Begin/resume instruction fetch and execution on the given sequencer |
| Halt_shred | Suspend instruction fetch and execution on the given sequencer |
| Report/self | Gather sequencer-specific information |
| Save/restore_shred | Save or restore the architecture states on the given sequencer |
| Single-step_shred | Single-step mode debug instruction processing on the given sequencer |

Figure 9:
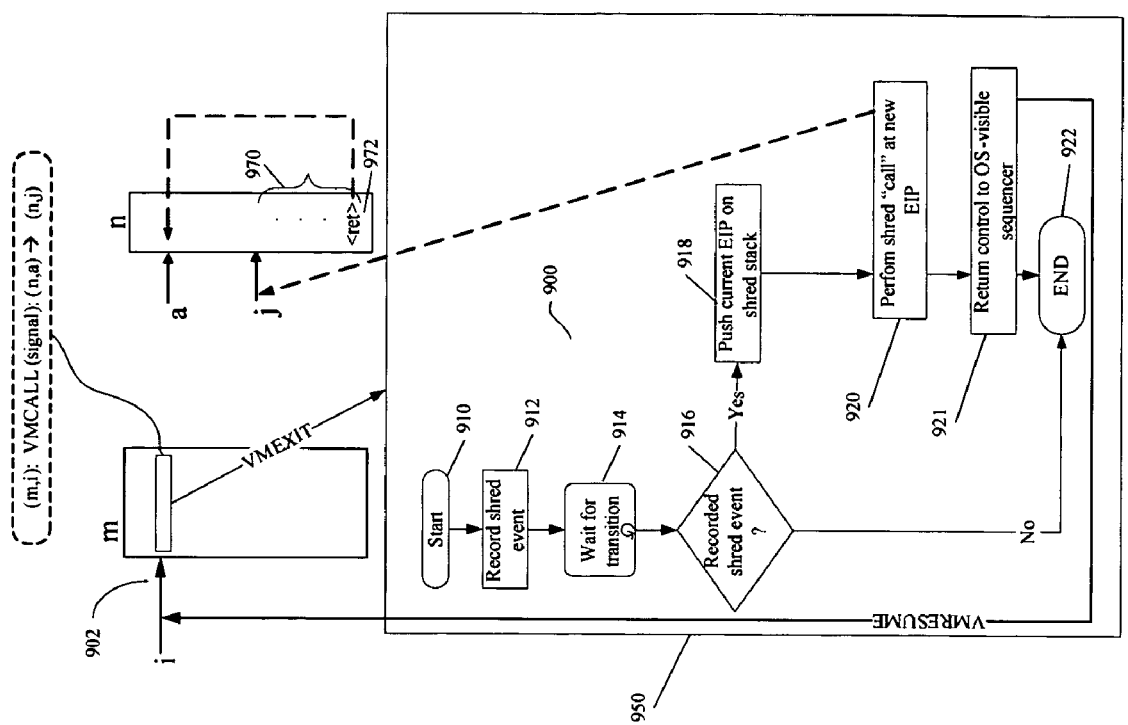
FIG. 9 is a control flow diagram illustrating a method and control flow for at least one embodiment a method for sequencer redirection.
Figure 10:
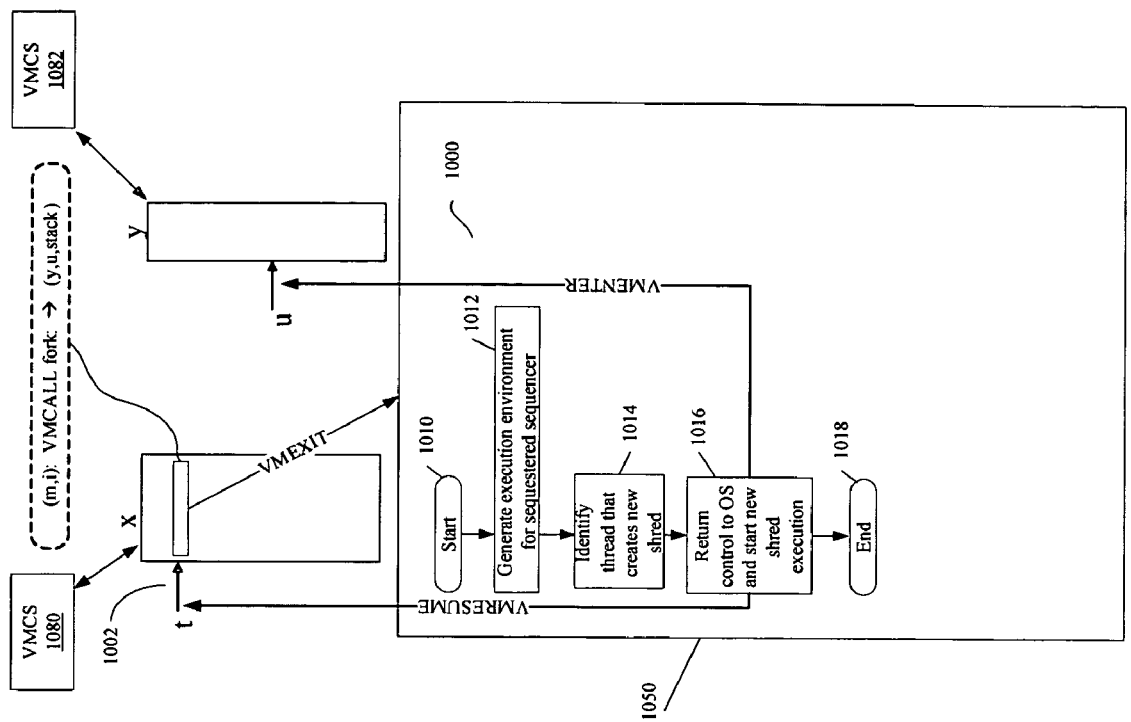
FIG. 10 is a control flow diagram illustrating a method and control flow for at least one embodiment of a method for shred creation.

The VMM thus provides an interface to implement the egress and ingress scenarios listed in Tables 1 and 2 in order to start and stop shred execution between the OS-visible and the OS-sequestered sequencers. Reference is now made to FIGS. 9 and 10 for example embodiments of methods 900, 1000 for utilizing a VMCALL instruction such that VMM facilitates inter-sequencer signaling from a shred-aware program running on an OS-visible sequencer to a sequestered sequencer. FIG. 9 illustrates at least one embodiment of a method 900 for processing a variant of the VMCALL instruction that directs a sequencer to continue execution at a new address. FIG. 10 illustrates at least one embodiment of a method 1000 for processing a variant of the VMCALL instruction that performs a fork operation.

FIG. 9 is a control flow diagram illustrating at least one embodiment of a method 900 and control flow for executing a variant of a VMCALL instruction to implement signaling to a sequestered sequencer via the SEL 950. Such variant may utilized, for example, for a shred that was previously suspended, and should now be resumed at an EIP other than that of its next instruction. For such use, the signaling variant may be conceptualized as a variant of the resume mechanism discussed below in connection with FIG. 12. The variant may also be used for any other signaling between sequencers. As such, the signaling variant illustrated in FIG. 9 may be utilized as a basic mechanism to implement one or more of the egress scenarios listed in Table 1. The method 900 illustrated in FIG. 9 may be performed by a sequencer arithmetic module of an SEL (see, e.g., sequencer arithmetic module 408 of SEL 402 illustrated in FIG. 4).

FIG. 9 illustrates that the method 900 may redirect execution of a sequestered sequencer, n, from one instruction pointer address (a) to another (j). Operations of the method 900 may be performed, for at least one embodiment, by an SEL 950 (whether embodied as part of a VMM or otherwise). For at least one embodiment, the method 900 may be performed by a sequencer arithmetic module (see 408, FIG. 4) of an SEL 950.

FIG. 9 illustrates that a method 900 for performing the VMCALL instruction may be triggered when an OS-visible sequencer, m, executes 902 a VMCALL instruction with parameters set to indicate that the VMCALL instruction is one that implements SXFR capability. In particular, FIG. 9 illustrates that the VMCALL instruction indicates a type of synchronous control transfer instruction, "redirect", that is to redirect a shred on a separate sequestered sequencer, n, to resume execution at a new EIP.

FIG. 9 illustrates that execution 902 of the VMCALL instruction on sequencer n generates a VMEXIT, which causes a trap from the guest OS (not shown) running on sequencer m to the SEL 950. Responsive to such trap, the SEL 950 begins execution of the method 900 at block 910, and processing proceeds to block 912.

Block 912 is performed for an embodiment wherein the SEL 950 may not immediately deliver the asynchronous interrupt event to the sequestered sequencer. For other embodiments, of course, the asynchronous interrupt may be immediately delivered, beginning at block 918, without performing blocks 912, 914, or 916. For the embodiment illustrated in FIG. 9, the SEL 950 records, at block 912, the fact that the redirect signal is in line for delivery to the designated sequencer, n. Processing then proceeds to block 914.

At block 914, the SEL 950 waits for a ring 0 to ring 3 transition to occur. Responsive to such transition, processing proceeds to block 916. At block 916, the SEL 950 determines that a shred event was previously recorded at block 912. Accordingly, processing proceeds to block 918 to process the event.

At block 918 the SEL 950 pushes the EIP at which the suspended shred on sequencer n should have resumed execution (shown in FIG. 9 as the address for instruction a) onto the stack associated with the shred. In this manner, the current EIP is saved for later resumption of the shred's current instruction stream. Processing then proceeds to block 920.

At block 920, the SEL 920 manipulates the shred stack to functionally simulate a "call" instruction for the shred on sequencer n to begin execution at instruction j. The VMM 950 thus causes the shred on sequencer n to resume at the new EIP, j. Processing for the method 900 then proceeds to block 921. At block 921 the SEL 920 returns control to the OS-visible sequencer, m. Processing then ends at block 922.

FIG. 9 illustrates that the shred that begins execution at the new EIP, j, may be considered a signal service routine 970. The signal service routine 970 may end with a return instruction 972. Execution by the sequencer, n, of the return instruction 972 may result in the resumption, on sequencer n, of processing at the EIP, a, at which it was interrupted. Such action may be effected, for various embodiments, by various mechanisms. For example, for at least one embodiment the following action may be performed responsive to the return instruction 972: upon execution of the return instruction 972, the sequencer n may pop off the stack the EIP value that was pushed onto the stack by the SEL 950 at block 918. The sequencer n may then resume processing at the EIP, a, at which it was interrupted.

Alternatively, other mechanisms may be employed to resume processing of sequencer n at the EIP, a, at which it was interrupted. For at least one alternative embodiment, popping the stack is not involved. Instead, another calling convention may be utilized. One such alternative calling invention, for example, is a branch-and-link style of return mechanism that utilizes registers rather than a stack.

FIG. 10 is a control flow diagram illustrating another embodiment of sequencer arithmetic capabilities that may be provided by an SEL 1050. FIG. 10 illustrates execution of a VMCALL instruction to implement a fork egress scenario. The VMM processes this particular variant of the VMCALL instruction to allow the OS-visible sequencer to send a signal (to start a new shred) to a sequestered sequencer. Again, the method 1000 illustrated in FIG. 10 may be performed by a sequencer arithmetic module of an SEL (see.e.g., sequencer arithmetic module 408 of SEL 402 as illustrated in FIG. 4).

FIG. 10 illustrates that the VMM may direct execution of the new thread to begin execution at a new Instruction Pointer address associated with a sequestered sequencer. Although FIG. 10 illustrates an embodiment wherein the fork instruction is generated by a shred-aware shred, such example should not be taken to be limiting. Embodiments of the present invention contemplate that a fork instruction may be executed by one sequestered sequencer to spawn a shred on another sequestered sequencer.

FIG. 10 illustrates that an SEL 1050 may, either in addition to or instead of the redirection illustrated in FIG. 9, utilize inter-sequencer signaling to perform a fork operation such that a user-generated instruction on an OS-visible sequencer, x, may cause spawning of a shred on a sequestered sequencer, y. As is illustrated in Table 1, above, an application programmer may place a VMCALL instruction for the fork egress scenario into a shred-aware application running on the OS-visible sequencer, x.

When a shred-aware program operating on the OS-visible sequencer, x, executes a "fork" variant of the VMCALL instruction (illustrated as the instruction at EIP "t" in FIG. 10), the "fork" egress scenario specified in the instruction causes transfer of control to the SEL 1050. Execution of the fork instruction is indicated at 1002 of FIG. 10. FIG. 10 illustrates that at least one embodiment of the fork variant for the VMCALL instruction indicates the EIP at which the spawned thread should begin execution ("u") and an indicator ("stack") to denote the stack space reserved for the new shred. As an optional parameter, the application programmer may specify the sequestered sequencer, y, on which the new shred is to be performed. Alternatively, the application programmer may leave such allocation function to the SEL 1050. The SEL 1050 may allocate sequestered sequencers for new shreds, for example, according to a round-robin allocation policy.

The resultant transfer of control as a result of the OS-visible sequencer's (x) execution of the fork variant of the VMCALL instruction is referred to in FIG. 10 as VMEXIT. Responsive to the VMEXIT, the SEL 1050 begins performing a method 1000 to perform the fork operation.

FIG. 10 illustrates that the method 1000 begins at block 1010 and proceeds to block 1012. At block 1012, the SEL 1050 allocates a sequestered sequencer, y, for the shred and generates an execution 1002 environment for the assigned sequencer, y. The execution environment is generated at block 1012, for at least one embodiment, in the following manner. It should be understood that the example provided below is simply one example embodiment that utilizes features of a WINDOWS operating system for illustrative purposes. However, other embodiments may generate the execution environment for a new shred utilizing other, or additional, structures.

The guest state area from the VMCS 1080 for sequencer x includes a snap shot of the state that has been set up by the operating system to execute the shred-aware application on sequencer x. Such guest state may include values for control registers, such as CR3, as well as values for the global descriptor table register ("GDTR") and segment registers. At block 1012 the guest state for sequencer x as reflected in VMCS 1080 is copied by the SEL 1050 to set up state in a VMCS 1082 associated with the sequestered sequencer, y, that has been allocated by the SEL 1050 to execute the new shred as identified in the VMCALL fork instruction.

The SEL 1050 thus uses the guest state for spawning sequencer, x, to populate the guest state for the sequencer, y, that is to execute the new shred. Accordingly, at block 1012 the SEL 1050 may effect the goal of creating for the sequestered sequencer y an execution environment that mimics to the execution environment set by the operating system for execution of the shred-aware application on sequencer x.

The SEL 1050 may then utilize (still at block 1012) the parameters of the VMCALL fork instruction to modify the sequestered sequencer's state in the VMCS 1082 for the sequestered sequencer, y. At block 1012 the guest EIP for the sequestered sequencer, y, may be modified in the VMCS 1082 to reflect the EIP, u, designated in the VMCALL fork instruction. Similarly, at block 1012 the SEL 1050 may also modify the guest stack pointer in the VMCS 1082 to reflect the stack pointer value, "stack", designated in the VMCALL fork instruction. At block 1012, the SEL 1050 may also modify flags in the VMCS 1082 for the sequestered sequencer, y, to indicate that all maskable interrupts are to be blocked during shred execution.

Except for these modified values (such as EIP, stack pointer, and interrupt flags), the guest state in the VMCS 1080 for the OS-visible shred-aware sequencer, x, is identical to the guest state (as reflected in VMCS 1082) that has been generated at block 1012 for the sequestered sequencer, y. Processing then proceeds to block 1014.

At block 1014, the SEL 1050 records the thread in whose context the shred will execute. For at least one WINDOWS-based embodiment, SEL 1050 utilizes an OS-assigned thread id to do so. Because, for at least one embodiment, all shreds generated by an OS-visible sequencer (such as x) are to shared the view of virtual memory as the OS-visible sequencer, the thread id value for the OS-visible sequencer is recorded at block 1014 to identify the process in whose context the new shred for the sequestered sequencer (such as y) is to execute. Processing then proceeds to block 1016.

At block 1016, the SEL 1050 allows the guest OS for the OS-visible sequencer, x, to resume execution of the shred-aware application on the OS-visible sequencer, x. for at least one embodiment, this is accomplished by executing a VMRESUME instruction, which transfers control back to the guest OS for the OS-visible sequencer, x. Also, the SEL 1050 performs a VMENTER operation to start execution of code of the shred on the sequestered sequencer, y, in the execution environment created at block 1012. Processing then ends at block 1018.

Upon the VMENTER, the sequestered sequencer's (y) view of memory is identical to that of sequencer x, since both sequencers are associated with the same GDT and CR3 register values for guest mode execution in their respective VMCS 1080, 1082. One of skill in the art will recognize that the GDT and CR3 register values affect how virtual addresses are translated into physical addresses during execution by the respective sequencer x, y.

FIG. 10 illustrates that, by performing the method 1000, the SEL 1050 effectively implements an asynchronous ingress scenario analogous to the go_shred ingress scenario illustrated in Table 2, above. The ingress scenario for the sequestered sequencer, x, may be performed responsive to the user-supplied VMCALL fork instruction in a shred-aware application. FIG. 10 illustrates that, after performing the other blocks 1010-1014 of the method 1000, the SEL 1050 starts execution at block 1016 of the shred code and the execution environment set up for the sequestered sequencer, y, is virtually identical to that set up by the operating system for the OS-controlled sequencer, x. In this manner, execution of the method 1000 by the SEL 1050 effectively achieves, for a fork operation, the shared memory parallel multi-processing paradigm discussed above in connection with FIGS. 1 and 2.

FIGS. 9 and 10 are provided to show specific illustrative examples of sequencer arithmetic capabilities for at least one embodiment of a software emulation layer. Such examples should not be taken to be limiting; an SEL 1050 may provide many other sequencer arithmetic capabilities.

User-level Exception Handling. For at least one embodiment of the mechanisms described herein, the execution of user-level shred instructions on sequestered sequencer(s) should be suspended upon a ring transition during shred execution on either the OS-visible sequencer or on a sequestered sequencer. A ring transition is often generated in response to an exception, interrupt, or system call generated on either an OS-visible sequencer or on a sequestered sequencer. For a ring transition on an OS-visible sequencer, execution of a suspended shred may be resumed when after the interrupt/exception/system call has been handled by the OS and the OS then schedules the shred-aware application for continued execution. For at least one embodiment, the shred suspension and resumption methods discussed below in connection with FIGS. 10 and 11 may be performed by a transition detection module (see, e.g., transition detection module 410 of SEL 402 as illustrated in FIG. 4).

Figure 11:
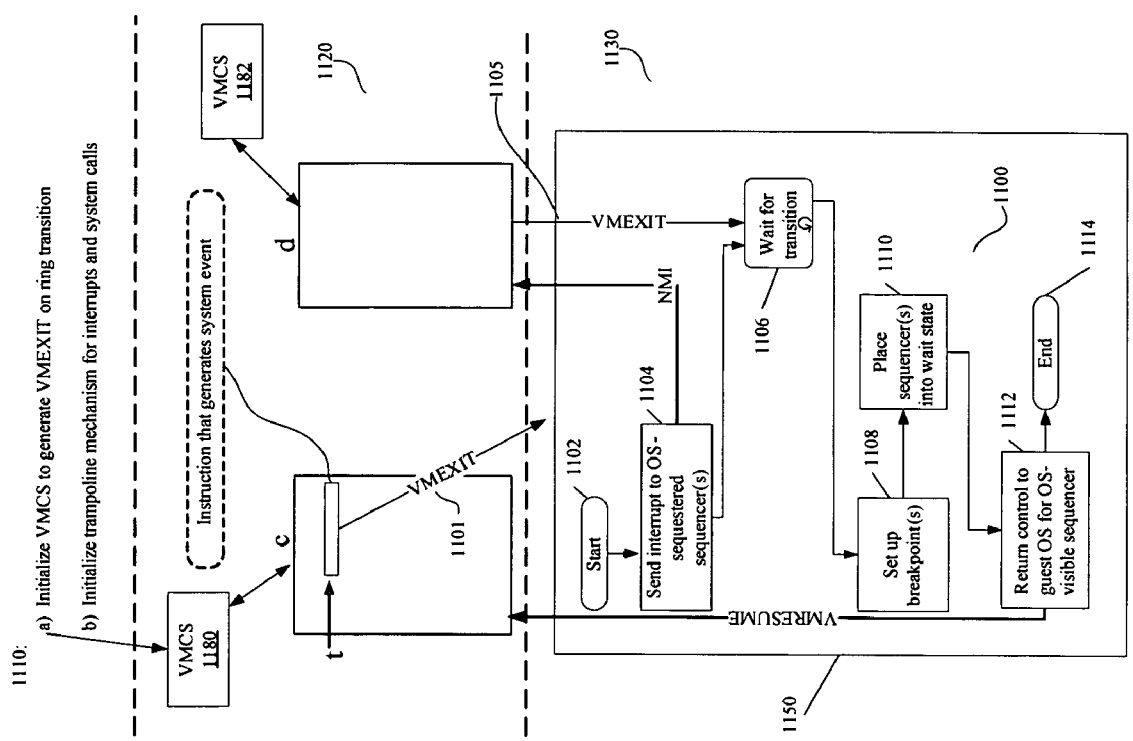
FIG. 11 is a control flow diagram illustrating at least one embodiment of shred suspension due to a ring transition.

FIG. 11 is a control flow diagram illustrating at least one embodiment of a mechanism for shred suspension due to a ring transition. The mechanism illustrated in FIG. 11 is presented in the context of a particular example—suspending shred execution on a sequestered sequencer, d, when a ring 3-to-ring 0 transition occurs on an OS-visible sequencer, c. Of course, one of skill in the art will recognize that similar suspend logic may also be employed when a ring 3-ring 0 transition occurs on an OS-sequestered sequencer (see discussion of proxy mechanism, below).

For at least one embodiment of the suspension mechanism illustrated in FIG. 11, three phases of operation are illustrated. In a first phase, 1110, initialization is performed. Such initialization 1110 may be performed by the SEL 1150. For at least one embodiment, the initialization 1110 is performed in order to provide that transitions from ring 3 to ring 0, due to an exception, will be recorded as exceptions and will therefore cause a VMEXIT. During such initialization 1110, a control structure is configured such that a transition to SEL 1150 control will occur any time that an exception due to a ring 3-to-ring 0 transition occurs during thread execution on the OS-visible sequencer, c.

For at least one embodiment, the initialization 1110 may be performed by setting in an exception bit map in the VMCS 1180 for the OS-visible sequencer, c, an exception bit for the desired system event (ring 3-to-ring 0 transition due to an exception on sequencer c). Although only one OS-visible sequencer, c, and its associated VMCS, 1180, are illustrated in FIG. 11, it should be understood that the initialization 1110 may be performed for multiple OS-visible sequencers.

For an embodiment in which the SEL 1150 is part of a VMM, the initialization 1110 effects a mechanism to use an exception bitmap of the VMCS 1180 to cause a VMEXIT (transfer of control to the VMM) upon occurrence of ring transitions to due to exceptions on sequencer c.

Of course, other types of system events, such as interrupts or system calls, may also occur during shred processing for the OS-visible sequencer, c. The initialization 1110 also provides for causing a VMEXIT upon occurrence of an interrupt or system call or other system event that requires OS handling on the OS-visible sequencer, c. For at least one embodiment, initialization 1110 for interrupts, system calls, and the like may be implemented via a trampoline mechanism. The trampoline mechanism briefly accepts control on a first "bounce" from a guest OS to perform certain shred suspension actions before "bouncing" control back to the guest OS.

For an embodiment of the trampoline mechanism for interrupts, the SEL 1150 may configure the mechanism for host control of interrupts so that the SEL 1150 gets control whenever an interrupt occurs when the guest O.S is running. For at least one embodiment, the SEL 1150 may invoke, during initialization 1110, a special driver. The driver may modify certain settings utilized by the OS-visible sequencer's guest OS to handle interrupts and system calls.

Without loss of generality, a specific example of configuring the trampoline mechanism is provided. However, the example should not be taken to be limiting in any respect, because such configuration may be accomplished in any of several different manners. For at least one example embodiment, a driver may, during initialization 1110, modify an interrupt descriptor table (IDT). Such modification may revise the offset in the IDT associated with one or more interrupt service routine(s) (ISR) associated with system calls and interrupts. The revised offset may cause a VMCALL to be generated before the ISR associated with the interrupt or system call is performed. The modification made to the IDT during initialization 1110 may thus cause control to "bounce" to the SEL 1150 when an interrupt or system call occurs on the OS-visible sequencer, c. As is discussed in further detail below, the SEL 1150 may take certain shred suspension actions before control is "bounced" back to the ISR for sequencer c.

A trampoline mechanism may be initialized at block 1110 in a similar fashion for system calls. At block 1110 the SEL 1150 may perform initialization such that the SEL 1150 can detect the occurrence of system calls. For at least one embodiment, this initialization may be effected by disabling fast system calls or other types of system calls that ordinarily bypass the SEL 1150. For such embodiment, disabling fast system calls may result in the guest OS for the OS-visible sequencer using an interrupt instruction (such as, e.g., INT) for system calls. Of course, for an embodiment wherein the SEL 1150 may trap fast system calls, fast system calls need not necessarily be disabled, and the modification of the IDT (mentioned in the following paragraph) may performed to ensure that fast system calls trap to the SEL 1150.

Initialization is further performed at block 1110 such that execution of an interrupt instruction (or other system call, such as a fast system call) by the guest OS for the OS-visible sequencer, c, may "bounce" control to the SEL 1150, in a similar fashion as is described above for interrupts (i.e., modification of the IDT). In other words, such initialization 1110 causes system calls to trap to the SEL 1150.

Finally, the initialization at block 1110 may also include initialization of OS-sequestered sequencers, such as sequencer d, such that they will trap to the SEL 1150 any time they receive a non-maskable interrupt (NMI) (see further discussion below in connection with block 1104). Such initialization may be performed by revising the exception bitmap for the VMCS 1182 associated with the sequestered sequencer, d, to indicate that transition to SEL 1150 control should occur when a NMI is received.

FIG. 11 illustrates that a second phase, 1120, may be performed by the OS-visible sequencer, c. During execution of a thread on the OS-visible sequencer, c, the sequencer may generate an exception due to a ring 3-to-ring 0 transition, or may encounter a system call, interrupt, or other system event that needs OS service. Due to the initialization 1110 discussed above, occurrence of such event may cause a VMEXIT-type transition to SEL 1150 control rather than allowing the guest OS for the sequencer, c, to immediately handle the event. For an embodiment where the SEL 1250 is part of a VMM, the transition 1101 generated during the second phase 1120 may be called a VMEXIT.

FIG. 11 illustrates that, upon the VMEXIT-type transition, control is transferred to the SEL 1150. During a third phase, 1130, the SEL 1150 performs a method 1100 for shred suspension. For an embodiment in which SEL 1150 logic is incorporated into a VMM, the method 1100 may be performed by the VMM.

FIG. 11 illustrates that the SEL 1150 performs the method 1100, responsive to a VMEXIT 1101 triggered by a system event on the OS-visible sequencer, c, prior to allowing the guest OS to handle the event on the OS-visible sequencer, c. Such mechanism may be employed at least for the reason that the guest OS is not aware of sequestered shreds and the shreds should therefore not continue execution while any kernel mode code of the guest OS is executing on an OS-visible sequencer.

FIG. 11 illustrates that the method 1100 begins at block 1102 and proceeds to block 1104. At block 1104 the SEL 1150 sends an interrupt to the one or more OS-sequestered sequencer(s), d, which are running code associated with shred-aware code executed by the OS-visible sequencer, c. FIG. 11 shows only one such sequestered sequencer, d. However, one of skill in the art will recognize that an interrupt may be issued at block 1104 to multiple sequestered sequencers. For at least one embodiment, the interrupt(s) issued at block 1104 are non-maskable interrupts, which cannot be ignored by the receiving sequencer. The SEL 1150 may cause the interrupt to be issued at block 1104, for one example, by programming a Advanced Programmable Interrupt Controller (APIC).

By causing the interrupt to be sent at block 1104, the SEL 1150 effectively triggers asynchronous suspension of shred execution on the sequestered sequencer, d, and therefore emulates a "suspend" shred control instruction. The triggering of the interrupt at block 1104 thus effects a halt_shred ingress scenario for the sequestered sequencer, d, analogous to that illustrated in Table 2. The SEL 1150 waits at block 1106 for a transition of control from the sequestered sequencer, d, based on the interrupt issued at block 1104.

FIG. 11 illustrates that the interrupt generated at block 1104 may be received by the OS-invisible sequencer, d, and may, in turn, cause a transition 1105 to SEL 1150 control for the sequestered sequencer, d. Again, for an embodiment wherein SEL 1150 logic is incorporated into a VMM, such transition 1105 may be referred to as a VMEXIT. (If an interrupt was issued to more than sequestered sequencer at block 1104, then each of the multiple sequencers will generate a VMEXIT and subsequent blocks 1108 and 1110 may be performed for each of the multiple sequestered sequencers.)

Responsive to the VMEXIT 1105 from the OS-sequestered sequencer, d, caused by the interrupt issued at block 1104, the SEL 150 detects the transition at block 106 and proceeds to perform block 1108. At block 1108, the SEL 1150 performs processing to prepare for resumption of the shred after the system event has been handled by an event handler routine of the guest OS of the OS-visible sequencer, c. To do so, at least one embodiment of the SEL 1150 utilizes code breakpoints.

Accordingly, at block 1108 the SEL 1150 may set a code breakpoint in one or more debug registers (DR) in order to set up a code breakpoint for the OS-visible sequencer, c, at the EIP instruction address, t, for the instruction at which the system event was originally triggered. It is assumed that, after the guest OS for the OS-visible sequencer, c, has handled the system event, it will begin execution of the shred-aware thread at EIP t and will thus trigger the breakpoint after the system event has been handled. (Further discussion of breakpoint processing is set forth below in connection with FIG. 12 and the discussion of a shred resumption mechanism). For at least one embodiment, the breakpoint mechanism allows the SEL 1150 to track ring transitions on the OS-visible sequencer in a manner that is transparent to the guest OS of the OS-visible sequencer, c, in that the breakpoints are not visible to the guest OS.

Processing then proceeds from block 1108 to block 1110. At block 1110, the SEL 1150 places each of the sequestered sequencers, d, associated with the shred-aware thread that generated the event on sequencer c into a wait state. Processing then proceeds to block 1112.

At block 1112, the SEL 1150 relinquishes control back to the guest OS for the OS-visible sequencer, c, so that the guest OS may handle the event. Processing then ends at block 1114.

Figure 12:
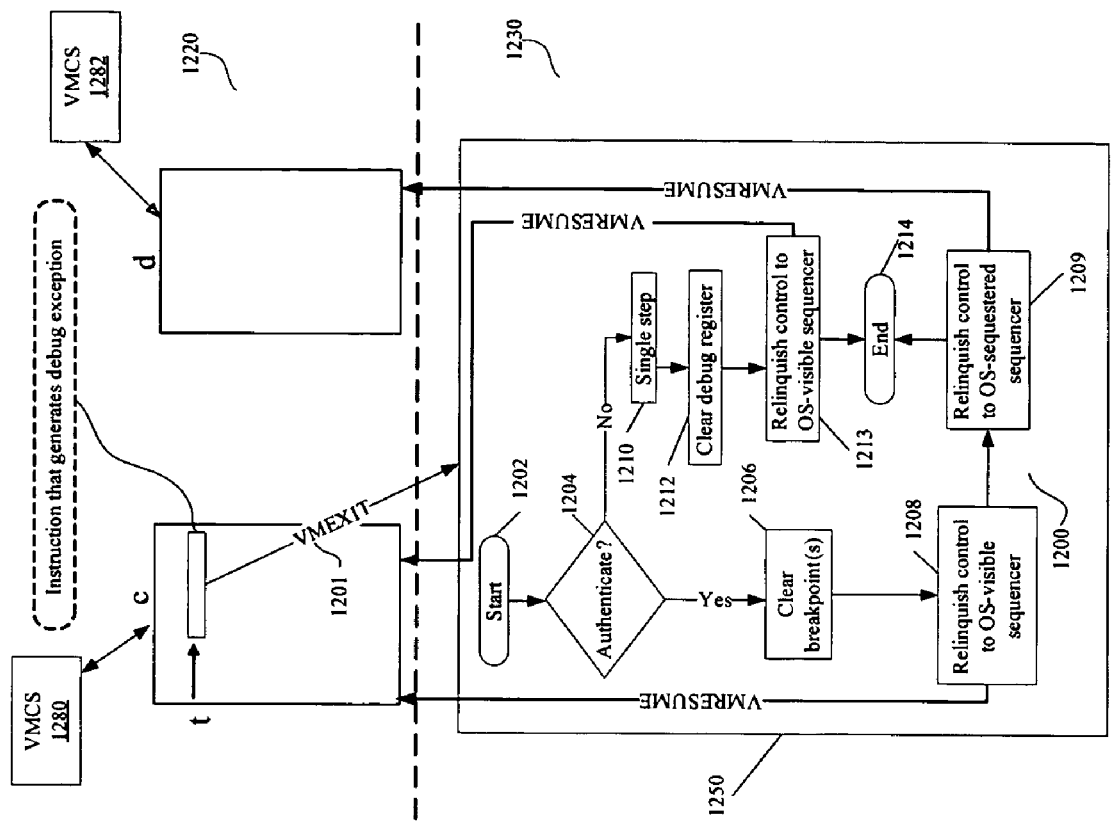
FIG. 12 is a control flow diagram illustrating at least one embodiment of shred resumption after a ring transition has been handled.

FIG. 12 is a control flow diagram illustrating control flow and a method 1200 for at least one embodiment of a mechanism for resuming shred execution after a ring transition. FIG. 12 illustrates a sample scenario that continues the sample scenario discussed in connection with FIG. 11, above.

FIG. 12 illustrates that OS-visible sequencer, c, has completed its event-handling sequence and has returned to execution of the shred-aware thread instruction stream that initially generated the event. That is, FIG. 12 illustrates that the OS-visible sequencer, c, has executed the instruction at EIP t, for which a breakpoint was set up at block 1108 of FIG. 11.

FIG. 12 illustrates that execution of the instruction, t, at which a breakpoint has been set up generates a debug exception that causes a transition 1201 to SEL 1250 control. The SEL 1250 thus relies on the breakpoint it set up during the suspension method 1100 (FIG. 11) to determine when to resume the shred.

FIG. 12 illustrates that the SEL 1250 begins execution of a shred resumption method 1200 in response to the transition 1201. The method begins at block 1202 and proceeds to block 1204. At block 1204, authentication is performed in order to confirm that appropriate shred has generated the debug exception and resultant control transition 1201. That is, for at least one embodiment a debug exception can be triggered when any thread, even a different thread, executes an instruction at the designated breakpoint EIP address.

At block 1204 the SEL 1250 thus confirms that a thread identifier associated with the thread generating the debug exception and resultant control transition 1201 matches the thread identifier for the thread with which the suspended shred is associated. For at least one embodiment, such authentication 1204 is performed by comparing a thread identifier (such as CR3 register value) in the guest area of the VMCS 1280 for the OS-visible sequencer, c, with a thread identifier value (such as CR3 register value) in the guest area of the VMCS 1282 for the sequestered sequencer, d. If the values match, processing proceeds to block 1206. Otherwise, the transition 1201 has been generated due to a "false hit," and processing proceeds to block 1210.

At block 1206, the SEL 1250 clears the breakpoint value that it previously set in the debug register at block 1108 of FIG. 11. Processing then proceeds to blocks 1208 and 1209, wherein control for both the OS-visible thread and the OS-invisible shred are relinquished by the SEL 1250 (not necessarily in the order shown). Processing then ends at block 1214.

At block 1210, the instruction at EIP t is single-stepped (which may include modification of an exception indicator, such as an EFLAGS indicator, to specify that an exception should be generated after execution, by sequencer c, of the next instruction). Processing then proceeds to block 1212. At block 1212, the debug register(s) are cleared of the breakpoint setting(s) generated at block 1108 of FIG. 11. Processing then proceeds to block 1213, where control is relinquished to the guest OS for the OS-visible sequencer. Processing of the method 1200 then ends at block 1214.

For at least one embodiment, an additional phase (not shown) of the resumption mechanism may be performed after control is relinquished to the OS-visible sequencer at block 1213, during processing for a "false hit." That is, after the guest OS has assumed control as a result of block 1213, it will execute its next instruction. Due to the single-stepping set up at block 1210, the guest OS will again experience an exception after the one instruction is executed. During processing for this exception, the SEL 1210 may re-set the debug registers so that it can perform the method 1200 to attempt to resume shred processing the next time the indicated EIP is performed by a shred on the OS-visible sequencer.

Figure 13:
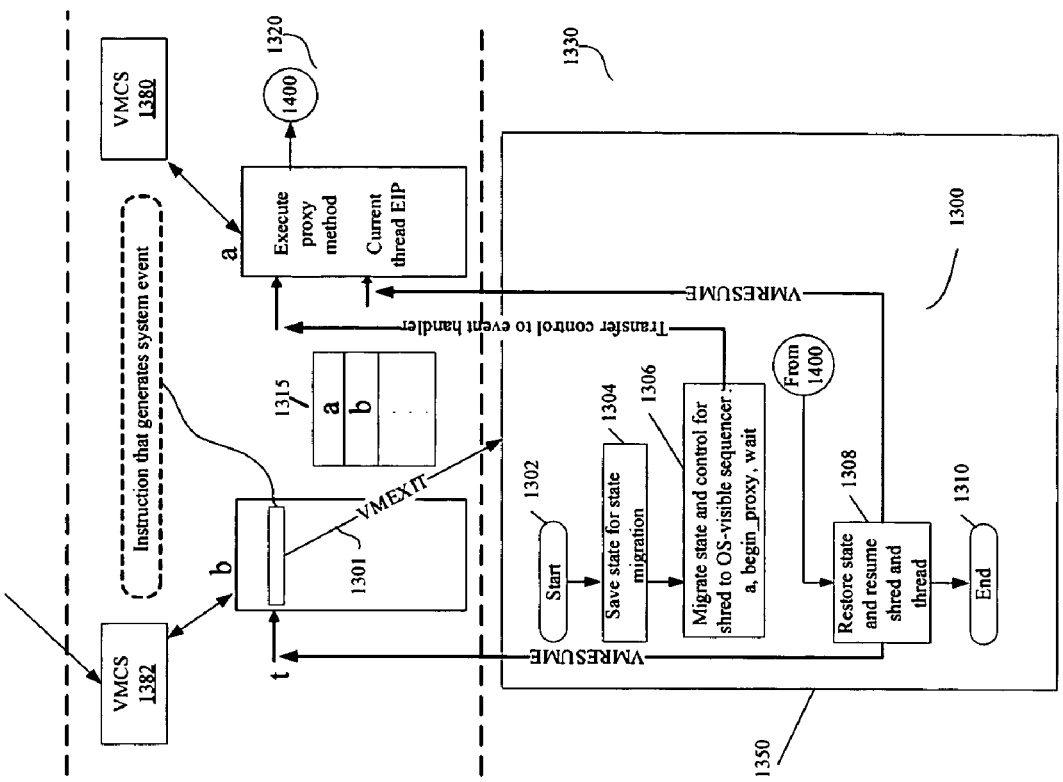
FIG. 13 is a control flow diagram illustrating at least one embodiment of a proxy execution mechanism.

Proxy Execution. As used herein the term Proxy Execution refers to inter-sequencer shred migration—the transfer of control and state information from a sequestered sequencer to an OS-visible sequencer so that the OS-visible sequencer may trigger an operating system to perform privileged operations on behalf of the sequestered sequencer. Proxy execution is therefore a means by which the OS-visible sequencer may get the attention of the operating system to handle system events that happen during the execution of a shred on a sequestered sequencer. Proxy execution may be utilized to present an illusion of architectural symmetry to an application programmer on a system that includes asymmetric sequencers. FIG. 13 is referenced for further discussion of proxy execution.

FIG. 13 is a control flow diagram illustrating at least one embodiment of a proxy execution mechanism in a multi-sequencer system that includes one or more sequestered sequencers, b, and one or more OS-visible sequencers, a. For at least one embodiment of proxy execution as illustrated in FIG. 13, it is assumed that a guest operating system for an OS-visible sequencer, a, is unaware of shreds executing on a sequestered sequencer, b. It is also assumed that a shred running on a sequestered sequencer, b, is not capable of executing privileged instructions that require OS service. For at least one embodiment, the method 1300 illustrated in FIG. 13 may be performed by a proxy execution module of a SEL (see module 406 of SEL 402 as illustrated in FIG. 4).

Generally, FIG. 13 illustrates an embodiment in which an OS-visible sequencer, a, impersonates a shred in order to handle events that require some form of service from the operating system, such as page faults, system calls, and the like. In this manner, the operating system is triggered to service a system event that has occurred during shred execution.

For purposes of illustration, FIG. 13 shows a method for utilizing proxy execution to handle a page fault generated by a shred. However, one of skill in the art will recognize that alternative embodiments of the method 1300 illustrated in FIG. 13 may be utilized to handle any exception, interrupt, system call, or other privileged event and/or system event on behalf of a shred.

For at least one embodiment of the proxy mechanism illustrated in FIG. 13, three phases of operation are illustrated. In a first phase, 1310, initialization is performed. Such initialization 1310 may be performed by the SEL 1350. During such initialization 1310, a control structure may be configured such that a transition to SEL 1350 control will occur any time that a shred running on the sequestered sequencer, b, encounters a selected type of system event. Such initialization 1310 may be performed for multiple types of system events, such as page faults, system calls, etc., for which proxy execution is desired. As a result of the initialization 1310, whenever one of the selected event types occurs during execution of a shred on the sequestered sequencer, b, the SEL 1350 will assume control. For an embodiment in which the SEL 1350 is part of a VMM, the initialization 1310 effects a mechanism to cause a VMEXIT (transfer of control to the VMM) upon occurrence of any of the selected system events.

For at least one embodiment, the initialization 1310 may be performed by setting in the VMCS 1382 for the sequestered sequencer, b, an exception bit for each desired system event. Although only one sequestered sequencer, b, and its associated VMCS, 1382, are illustrated in FIG. 13, it should be understood that the initialization 1310 may be performed for multiple sequestered sequencers.

FIG. 13 illustrates that a second phase, 1320, may be performed by the sequestered sequencer, b. During execution of a shred on the sequestered sequencer, b, the sequencer may generate one of the selected system events. Responsive to the system event, an event handler (not shown) for the shred may capture the current state of the shred, including current EIP for the shred as well as any error codes generated by the sequencer that facilitate event handling or identification. (For an embodiment that includes as the guest OS a WINDOWS operating system, capturing the shred state may include capturing the value of the CR2 control register, to capture the address of the instruction that caused the system event). The event handler may then generate a transition 1301 to SEL 1350 control. For an embodiment where the SEL 1350 is part of a VMM, the transition 1301 generated during the second phase 1320 may be called a VMEXIT.

During the second phase 1320, then, a transition to SEL 1350 control (such as a VMEXIT), is triggered when one of the selected system events occurs. Such transition 1301 may be triggered based on the exception bits set, during initialization 1310 for the sequencer, b, in the sequencer's VMCS 1382.

FIG. 13 illustrates that, upon the VMEXIT-type transition 1301, control is transferred to the SEL 1350. During a third phase, 1330, the SEL 1350 performs a method 1300 of proxy execution. Generally, the method 1300 involves a) saving the state of an OS-visible thread running on an OS-visible sequencer, b) migrating state from the event-generating shred to the OS-visible sequencer, c) transferring control to the OS-visible sequencer so that it can reproduce (if feasible) on the OS-visible sequencer the event that occurred on the sequestered sequencer, so that d) the operating system services the event, e) resuming SEL control and restoring the original state of the OS-visible sequencer, and f) then continuing original execution streams for both the OS-visible and sequestered sequencers. Each of these elements of the method 1300 are discussed in further detail below.

For an alternative embodiment, the SEL 1350 may, rather than performing the method 1300, simply trap the event and then may jump to a pre-assigned address to perform a user-generated error-handling routine. For such alternative embodiment, the functions of the method 1300 may be performed by the user-generated error-handling routine rather than by the SEL 1350.

FIG. 13 illustrates that the method 1300 begins at block 1302 and proceeds to block 1304. At block 1304, the SEL 1350 prepares to migrate the shred state from the sequestered sequencer, b, to the OS-visible sequencer, a. For at least one embodiment, such preparation 1304 includes saving the state of the event-generating sequestered sequencer, b, to a state storage area 1315 (see area "b") that is also accessible by the OS-visible sequencer a. Such action may be performed, for at least one embodiment, in response to a specific context state storage variant of the VMCALL instruction executed by the SEL 1350. For at least one embodiment, a sample context state storage variant, referred to herein as SSAVE, specifies a sequencer identifier and a pointer into the save area 1315.

Preparation 1304 for shred state migration may further include, for at least one embodiment, saving the state of the OS-visible sequencer, a, before such sequencer adopts the state of the sequestered sequencer. In such manner, the state of the OS-visible sequencer, a, is saved and may be later restored when the OS-visible sequencer, a, resumes its own thread. Again, the state for the OS-visible sequencer, a, may be saved to the save area 1315 (see area "a") in response to a context save instruction that specifies a pointer into the save area 1315. Processing may then proceed from block 1304 to block 1306.

At block 1306, control for the event-generating shred is transferred from the sequestered sequencer, b, to the OS-visible sequencer, a. For at least one embodiment, the transfer 1306 is effected by the performance of an ingress scenario for the OS-visible shred, which may be triggered by the SEL's execution of a proxy variant of a VMCALL instruction. (For an alternative embodiment, mentioned above, the transfer 1306 may be effected by a VMCALL proxy instruction that is generated by an error handling routine (not shown) on the sequestered sequencer, b.)

The proxy variant of a VMCALL instruction may indicate the following parameters: destination sequencer identifier, ingress scenario identifier, and wait/no-wait indicator. Block 1306 of FIG. 13 illustrates that the parameters for a sample proxy instruction for the example shown in FIG. 13 may include the following parameter values: a, begin_proxy, wait. Accordingly, control is transferred to sequencer a, to begin performing the proxy scenario, and the sequestered sequencer (b) is to wait for completion of the proxy scenario before continuing execution of its own instruction stream.

For at least one embodiment, the migration of control 1306, when performed by the SEL 1350, is performed when the SEL 1350 assumes control responsive to a ring 0-ring 3 transition on the OS-visible sequencer. However, such waiting is not required. At least one alternative embodiment, the migration of control 1306 is performed immediately, rather than waiting for the next transition to SEL 1350 control.

Control migration 1306 includes, for at least one embodiment, migrating the saved state (including CR2 and EIP) for the event-generating sequencer, b, from the state area 1315 (portion b) to the proxy sequencer, a. Before transferring control, the SEL 1350 may also, at block 1306, take steps to inject the system event on the OS-visible processor, a.

FIG. 13 illustrates that, responsive to the control transfer executed at block 1306, control is returned to the OS for the OS-visible sequencer, a. The control transfer 1306 may be implemented as a yield instruction, such that the OS-visible sequencer, a, suspends execution of its current thread and begins execution at the EIP begin_proxy, which is the beginning of a proxy execution routine 1400.

After the OS-visible sequencer, a, has performed the proxy execution routine 1400 (discussed below in connection with FIG. 14), control returns to the SEL 1350 at block 1308. At block 1308, the SEL 1350 restores the OS-visible sequencer's original state (which was saved at block 1304) from the state save area 1315. Such restoration of state may be implemented by an RSTOR variant of the VMCALL instruction, analogous to the RSTOR scenario listed above in Table 1. Similarly, at block 1308 the SEL 1350 restores the sequestered sequencer's original state (which was also saved at block 1304), from its associated portion, b, of the state save area 1315. The VMM 1350 then resumes both the shred on the sequestered sequencer, b, and the thread on the OS-visible sequencer, a. The method 1300 then ends at block 1310.

Figure 14:
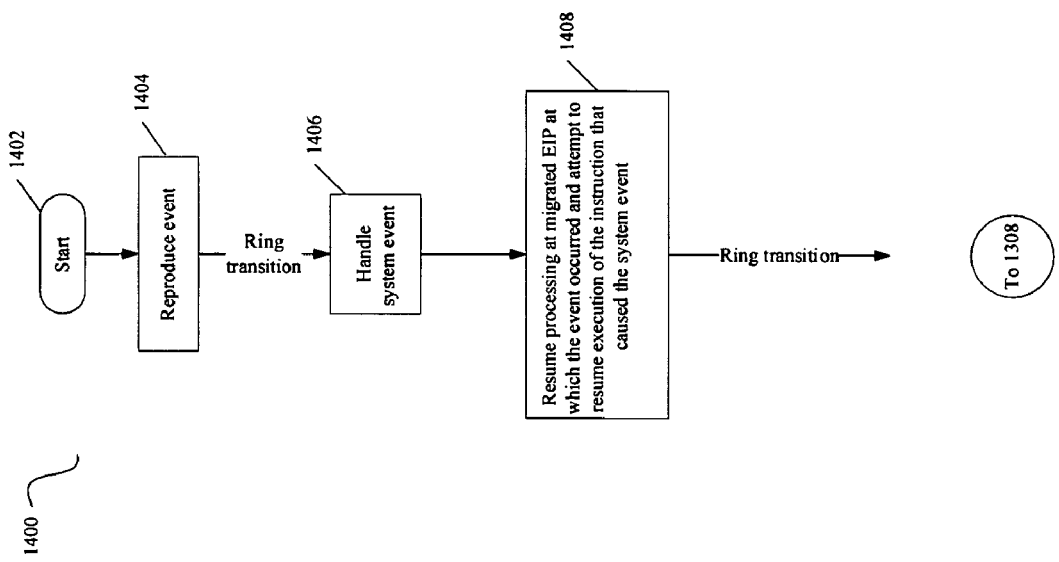
FIG. 14 is a flowchart illustrating at least on embodiment of a proxy execution method.
Figure 15:
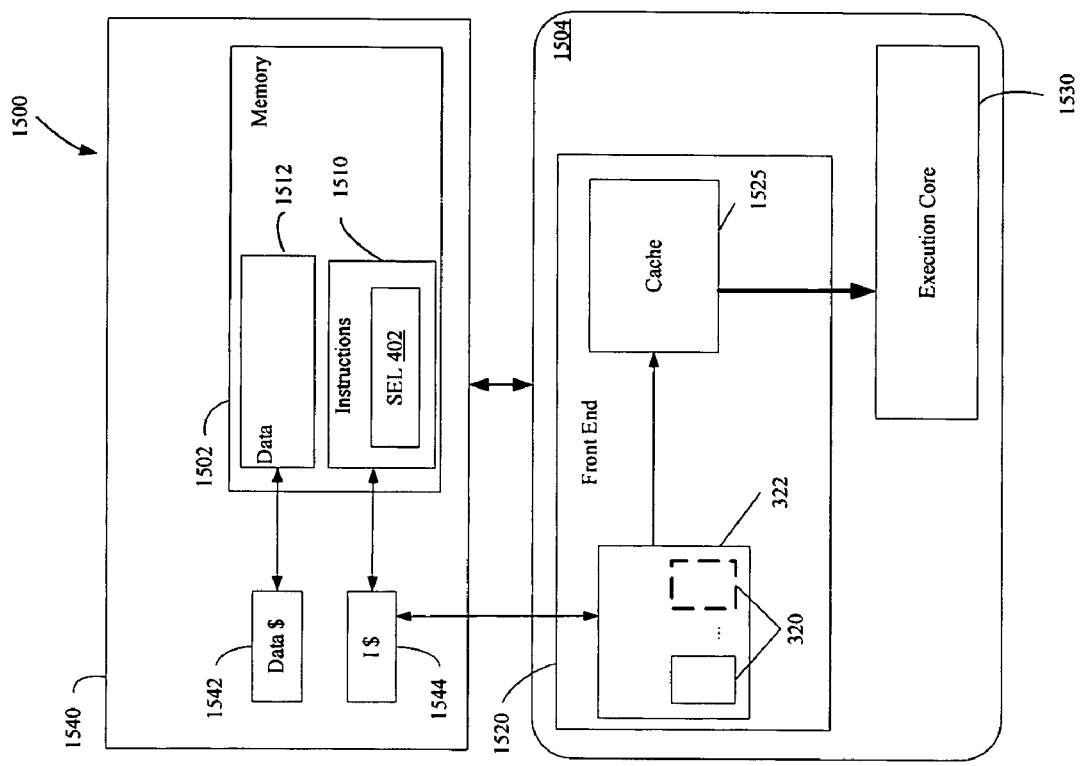
FIG. 15 is a block diagram illustrating at least one embodiment of a system capable of performing disclosed techniques.

FIG. 14 is a flowchart illustrating a proxy execution method 1400. For at least one embodiment, such method 1400 may be performed by one sequencer, such as an OS-visible sequencer, on behalf of another sequencer, such as a sequestered sequencer. FIG. 14 illustrates that the method 1400 begins at block 1402 and proceeds to block 1404.

At block 1404, the OS-visible sequencer attempts to reproduce the system event that was triggered on the sequestered sequencer. For at least one embodiment, reproduction of the system event may be accomplished via injection by the SEL 1350 of a system event to the OS for the OS-visible sequencer, a. (See discussion of block 1306, above). For at least one embodiment, such event may be injected using a "vector on entry" feature, which allows the VMM to inject an exception and then resume the guest OS. In this manner, the SEL 1350 may impersonate the system event on the proxy sequencer, a. FIG. 14 illustrates that impersonation of the event may cause a ring 3-to-ring 0 transition on the OS-visible sequencer.

Processing then proceeds to block 1406. At block 1406, the OS for the proxy sequencer handles the system event at ring 0 privilege level (see discussion of deprivileged ring 0 level "OD" in connection with FIG. 8, above). For example, if the event is a page fault, the event may be handled 1406 by paging from disk, if needed. The guest OS's event handler may perform additional tasks as well, such as modify page tables, etc. The method 1400 then proceeds to block 1408.

At block 1408, the proxy sequencer attempts to execute the next instruction in its instruction stream, as indicated by its current EIP value. One will note that, for at least one embodiment, the EIP for the proxy sequencer may have been modified due to proxy-related state migration (see block 1306, FIG. 13). Thus, at block 1408 the proxy sequencer may attempt to execute the instruction that caused the event that triggered proxy execution in the first place (see, e.g., instruction at EIP t in FIG. 13). For at least one embodiment, the attempt to execute a privileged instruction will cause a ring 3-to-ring 0 transition.

Accordingly, after the guest OS for the OS-visible sequencer has serviced the exception at block 1406, a ring O-to-ring 3 transition may occur when the sequencer attempts to execute the event-triggering instruction at block 1408. The transition indicates the completion of OS event-handling service. Thus, the transition signals the end of proxy execution service. When proxy execution has thus completed, impersonated processing on the OS-visible processor is complete and control it is thus appropriate to migrate control back to the original sequencer, b. Due to initialization that may have been performed, for example, at block 730 of FIG. 7, the exception generated upon a ring transition causes a trap to the SEL 1350.

Upon the ring transition generated by the attempt at block 1408 to execute the event-generating instruction, control transitions back to the SEL 1350 (see block 1308 of FIG. 13).

While the processing discussed above in connection with FIG. 13 is discussed in the illustrative context of utilizing an OS-visible sequencer to perform operations on behalf of an OS-invisible sequencer, such illustrative context should not be taken to be limiting. For an alternative embodiment, for example, an alternative embodiment of the proxy mechanism illustrated in FIG. 13 may be utilized so that one OS-sequestered sequencer can execute instructions on behalf of another OS-sequestered sequencer. Such embodiment may be utilized, for example, on a multi-sequencer system that includes asymmetric sequencers.

Thus, it should be noted that the sequencers of a system capable of performing embodiments of techniques disclosed herein need not be symmetric. Sequencers may differ in any manner, including those aspects that affect quality of computation. For example, the sequencers may differ in terms of power consumption, speed of computational performance, functional features, or the like. By way of example, for one embodiment, the sequencers may differ in terms of functionality. The example of functional asymmetry illustrated in FIGS. 7-13 show that at least one sequencer may be visible to the OS (see, for example, 140 of FIG. 1) and may therefore be capable of performing "ring 0" operations such as performing system calls, servicing a page fault, and the like. On the other hand, one or more other sequencers may be sequestered from the OS, and therefore be incapable of performing ring 0 operations. However, this is just one example of functional symmetry. The sequencers of a multi-sequencer system may also differ in any other manner, such as dimensions, word and/or data path size, topology, memory, power consumption, number of functional units, communication architectures (multi-drop vs. point-to-point interconnect), or any other metric related to functionality, performance, footprint, or the like.

For example, one sequencer may be capable of executing integer and floating point instructions, but cannot execute a single instruction multiple data ("SIMD") set of instruction extensions, such as Streaming SIMD Extensions 3 ("SSE3"). On the other hand, another sequencer may be capable of performing all the instructions that the first sequencer can execute, and can also execute SSE3 instructions. For such embodiments, an alternative embodiment of the proxy mechanism illustrated in FIG. 13 may be utilized so that one OS-sequestered sequencer, such as one capable of performing SSE3 instructions, may act as a proxy to execute code for another OS-sequestered sequencer, such as one that is not capable of executing SSE3 instructions. Similarly, an embodiment of the proxy execution mechanism may be invoked to effect execution of, for example, special floating point instructions that are not supported by a sequestered processor. In this manner, asymmetry may be transparent to the application programmer.

The shredding emulation layer and associated techniques discussed herein may be implemented on any multi-sequencer system, including a single-core SMT system (see, e.g., 310 of FIG. 3) and a multi-core system (see, e.g., 350 of FIG. 3). Further discussion of such systems is discussed below in connection with FIG. 15.

FIG. 15 illustrates at least one sample embodiment of a computing system 1500 capable of performing disclosed techniques. The computing system 1500 includes at least one processor core 1504 and a memory system 1540. Memory system 1540 may include larger, relatively slower memory storage 1502, as well as one or more smaller, relatively fast caches, such as an instruction cache 1544 and/or a data cache 1542. The memory storage 1502 may store instructions 1510 and data 1512 for controlling the operation of the processor core 1504.

Memory system 1540 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 1540 may store instructions 1510 and/or data 1512 represented by data signals that may be executed by processor 1504. The instructions 1510 and/or data 1512 may include code and/or data for performing any or all of the techniques discussed herein. For example, the instructions 1510 may include instructions to implement a shredding emulation layer 402.

The processor 1504 may include a front end 1520 that supplies instruction information to an execution core 1530. Fetched instruction information may be buffered in a cache 1525 to await execution by the execution core 1530. The front end 1520 may supply the instruction information to the execution core 1530 in program order. For at least one embodiment, the front end 1520 includes a fetch/decode unit 322 that determines the next instruction to be executed. For at least one embodiment of the system 1500, the fetch/decode unit 322 may include a single next-instruction-pointer and fetch logic 320. However, in an embodiment where each processor 1504 supports multiple thread contexts, the fetch/decode unit 322 implements distinct next-instruction-pointer and fetch logic 320 for each supported thread context. The optional nature of additional next-instruction-pointer and fetch logic 320 in a multiprocessor environment is denoted by dotted lines in FIG. 15.

Embodiments of the methods described herein may be implemented in hardware, hardware emulation software or other software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Sample system 1400 is representative of processing systems based on the Pentium®, Pentium® Pro, Pentium® II, Pentium® III, Pentium® 4, and Itanium® and Itanium® 2 microprocessors available from Intel Corporation, although other systems (including personal computers (PCs) having other microprocessors, engineering workstations, personal digital assistants and other hand-held devices, set-top boxes and the like) may also be used. For one embodiment, sample system may execute a version of the Windows™ operating system available from Microsoft Corporation, although other operating systems and graphical user interfaces, for example, may also be used.

While particular embodiments of the present invention have been shown and described, it will be obvious to those skilled in the art that changes and modifications can be made without departing from the scope of the appended claims in their broader aspects. The appended claims are to encompass within their scope all such changes and modifications that fall within the true scope of the present invention.

What is claimed is:

1. A method, comprising:
    issuing one or more thread control signals to a sequencer that is sequestered from an operating system (OS), wherein said issuing is performed by an abstraction emulation layer in response to a user-generated instruction; and
    performing a set of operations to cause suspension of execution on the sequestered sequencer; wherein said set of operations are performed by the abstraction layer in response to a ring transition on an OS-visible sequencer and wherein said set of operations further include issuing said one or more control signals, wherein said control signals include a signal to place the sequestered sequencer into a wait state.

2. The method of claim 1, wherein:
    said issuing is further performed by the abstraction layer in response to execution, on an OS-visible sequencer, of the user-generated instruction in an OS-visible thread.

3. The method of claim 1, wherein:
    said one or more thread control signals further comprise a signal to cause the sequestered sequencer to begin executing a sequence of instructions.

4. The method of claim 3, wherein:
    said one or more thread control signals further comprises a signal to cause the sequestered sequencer to begin executing a sequence of instructions at a modified instruction pointer address.

5. The method of claim 1, further comprising:
    concurrently executing on a first sequencer a first instruction sequence, scheduled by the operating system, where the first instruction sequence includes the user-generated instruction;
    while executing on the sequestered sequencer a second instruction sequence.

6. The method of claim 1, further comprising:
    generating an execution environment for the sequestered sequencer;
    wherein said generating is performed by the abstraction layer.

7. The method of claim 1, wherein said thread control signal further comprises:
    a signal to interrupt execution on the sequestered sequencer.

8. The method of claim 1, further comprising:
    performing a set of operations to cause an OS-visible sequencer to trigger execution of an event handling routine on behalf of the sequestered sequencer;
    wherein said set of operations are performed by the abstraction layer.

9. The method of claim 8, wherein said set of operations further comprise:
    migrating state for the sequestered sequencer to the OS-visible sequencer.

10. The method of claim 1, wherein said set of operations further comprises:
    tracking ring transitions on the OS-visible sequencer in a manner that is transparent to the OS.

11. The method of claim 1, further comprising:
    performing a set of operations to cause resumption of execution on the sequestered sequencer;
    wherein said set of operations are performed by the abstraction layer in response to completion of an exception-handling routine on an OS-visible sequencer; and
    wherein said set of operations further include issuing said one or more control signals, wherein said control signals include a signal to resume execution on the sequestered sequencer.

12. The method of claim 11, wherein said set of operations further comprises:
    clearing a breakpoint on the OS-visible sequencer.

13. The method of claim 10, wherein said tracking further comprises:
    setting up a breakpoint for the OS-visible sequencer.

14. The method of claim 7, wherein said thread control signal further comprises:
    an interrupt signal.

15. A system comprising:

a plurality of sequencers to concurrently execute a plurality of instruction streams;

a memory coupled to the sequencers;

an abstraction layer, coupled to the sequencers, to sequester one or more of said sequencers from an operating system;

wherein said abstraction layer is further to control execution of one or more said instruction streams on one or more of said sequestered sequencers, wherein said abstraction layer further includes a transition detection module to cause at least one of the sequestered sequencers to suspend operation during a ring 0 operation of the operating system, and wherein the sequestered sequencer is to be placed into a wait state.

16. The system of claim 15, wherein:

at least one of said plurality of sequencers is computationally asymmetric with respect to one or more of the other sequencers.

17. The system of claim 15, wherein:

said abstraction layer further includes a sequencer sequestration module to sequester the one or more sequencers.

18. The system of claim 15, wherein:

said abstraction layer further includes a proxy execution module to invoke operating system service for the sequestered sequencers.

19. The system of claim 15, wherein:

said abstraction layer further includes a sequencer arithmetic module to provide signaling between at least two of the plurality of sequencers.

20. The system of claim 15, wherein:

said abstraction layer further includes a transition detection module to cause at least one of the sequestered sequencers to resume operation after a ring 0 operation of the operating system.

21. The system of claim 15, wherein:

said memory is a DRAM.

22. The system of claim 15, wherein:

instructions for said abstraction layer are included in said memory.

23. The system of claim 15, wherein:

said memory includes instructions to run the operating system as a guest of the abstraction layer.

24. An article comprising a machine-accessible storage medium having a plurality of machine accessible instructions for an abstraction layer, wherein, when the instructions are executed by a processor, the instructions provide for:

issuing one or more thread control signals to a sequencer that is sequestered from an operating system (OS);

wherein said issuing is performed by the abstraction layer in response to a user-generated instruction, wherein the abstraction layer instructions further include instructions that, when executed by the processor, provide for:

performing a set of operations to cause suspension of execution on the sequestered sequencer; wherein said set of operations are performed by the abstraction layer in response to a ring transition on an OS-visible sequencer; and wherein said set of operations further include issuing said one or more control signals, wherein said control signals include a signal to place the sequestered sequencer into a wait state.

25. The article of claim 24, wherein:

said instructions for said issuing are further performed by the abstraction layer in response to execution, on an OS-visible sequencer, of the user-generated instruction in an OS-visible thread.

26. The article of claim 24, wherein said set of operations further comprises:

setting up a breakpoint on the OS-visible sequencer.

27. The article of claim 24, wherein said set of operations further comprises:

clearing a breakpoint on the OS-visible sequencer.

28. The article of claim 24, wherein:

said one or more thread control signals further comprise a signal to cause the sequestered sequencer to begin executing a sequence of instructions.

29. The article of claim 28, wherein:

said one or more thread control signals further comprises a signal to cause the sequestered sequencer to begin executing a sequence of instructions at a modified instruction pointer address.

30. The article of claim 24, wherein said processor is further to:

concurrently execute on a first sequencer a first instruction sequence, scheduled by the operating system, where the first instruction sequence includes the user-generated instruction;

while executing on the sequestered sequencer a second instruction sequence.

31. The article of claim 24, wherein the abstraction layer instruction further include instructions that, when executed by the processor, provide for:

generating an execution environment for the sequestered sequencer.

32. The article of claim 24, wherein said thread control signal further comprises:

a signal to interrupt execution on the sequestered sequencer.

33. The article of claim 32, wherein said thread control signal further comprises:

an interrupt signal.

34. The article of claim 24, wherein the abstraction layer instructions further include instructions that, when executed by the processor, provide for:

performing a set of operations to cause an OS-visible sequencer to trigger execution of an event handling routine on behalf of the sequestered sequencer.

35. The article of claim 34, wherein said set of operations further comprise:

migrating state for the sequestered sequencer to the OS-visible sequencer.

36. The article of claim 24, wherein the abstraction layer instructions further include instructions that, when executed by the processor, provide for:

performing a set of operations to cause resumption of execution on the sequestered sequencer;

wherein said set of operations are to be performed by the abstraction layer in response to completion of an exception-handling routine on an OS-visible sequencer; and wherein said set of operations further include issuing said one or more control signals, wherein said control signals include a signal to resume execution on the sequestered sequencer.

37. The article of claim 36, wherein said set of operations further comprises:

clearing a breakpoint on the OS-visible sequencer.

* * * * *